US012566688B1

(12) United States Patent
Johnson et al.

(10) Patent No.: US 12,566,688 B1
(45) Date of Patent: Mar. 3, 2026

(54) ERROR PARAMETER GENERATION AND UTILIZATION FOR DATA PROJECTIONS IN A COMPUTING STORAGE NETWORK

(71) Applicant: Veeva Systems Inc., Pleasanton, CA (US)

(72) Inventors: Bryan Wayne Johnson, Brookline, MA (US); Myrto M. Miltiadous, New York, NY (US); Christopher George Glazner, New York, NY (US); Eshaan Ghosh, Milton (CA); Colin O'Laughlin, Brooklyn, NY (US); Vasile Iulian Ilies, Boston, MA (US)

(73) Assignee: Veeva Systems Inc., Pleasanton, CA (US)

( * ) Notice: Subject to any disclaimer, the term of this patent is extended or adjusted under 35 U.S.C. 154(b) by 0 days.

(21) Appl. No.: 19/191,927

(22) Filed: Apr. 28, 2025

Related U.S. Application Data

(60) Provisional application No. 63/781,684, filed on Apr. 1, 2025.

(51) Int. Cl.
  *G06F 11/30* (2006.01)
  *G06F 16/2457* (2019.01)

(52) U.S. Cl.
  CPC ...... *G06F 11/3068* (2013.01); *G06F 11/3034* (2013.01); *G06F 16/24578* (2019.01)

(58) Field of Classification Search
  CPC ............. G06F 11/3068; G06F 11/3065; G06F 11/3062; G06F 11/3058; G06F 11/30; G06F 11/00; G06F 11/3034; G06F 11/3031; G06F 11/3003; G06F 16/24578; G06F 16/2457; G06F 16/245; G06F 16/24; G06F 16/20; G06F 16/00
  See application file for complete search history.

(56) References Cited

U.S. PATENT DOCUMENTS

| | | | | |
|---|---|---|---|---|
| 11,093,139 | B1 * | 8/2021 | Karr ...................... | G06F 3/0652 |
| 2003/0187853 | A1 * | 10/2003 | Hensley ................. | G06Q 10/10 |
| 2019/0361626 | A1 * | 11/2019 | East ....................... | G06F 3/0629 |
| 2023/0020268 | A1 * | 1/2023 | Pakatci ................. | G06F 3/0634 |
| 2023/0367479 | A1 * | 11/2023 | Colgrove .............. | G06F 3/0608 |

* cited by examiner

*Primary Examiner* — Mohamed Charioui
(74) *Attorney, Agent, or Firm* — Finnegan, Henderson, Farabow, Garrett & Dunner, LLP

(57) ABSTRACT

The disclosed methods include: generating first projected data, second projected data, and third projected; determining or estimating an error parameter associated with the first projected data, the second projected data, and the third projected data; ranking, based on the error parameter, the first projected data, the second projected data, and the third projected data; selecting, based on the ranking, at least one of the first projected data, the second projected data, and the third projected data; and generating, based on selecting one of the first projected data or the second projected data, or the third projected data, a digital report. According to one embodiment, the digital report indicates: dispensing projection data of a configurable data object; and protocol projection data or procedure projection data.

20 Claims, 11 Drawing Sheets

200a

ACTIVATING A COMPUTING STORAGE NETWORK, THE COMPUTING STORAGE NETWORK BEING COMMUNICATIVELY CONNECTED TO: A COMPUTING MODEL REPOSITORY; A METRIC DATA REPOSITORY; AND A RECORD REPOSITORY THAT IS EXTERNAL TO THE COMPUTING STORAGE NETWORK
202

DETERMINING A FIRST COMPUTING MODEL COMPRISED IN THE COMPUTING MODEL REPOSITORY
204

DETERMINING OR ACCESSING FIRST DATA COMPRISED IN THE METRIC DATA REPOSITORY
206

GENERATING, BASED ON THE FIRST COMPUTING MODEL, BASED ON THE FIRST DATA COMPRISED IN THE METRIC DATA REPOSITORY, FIRST PROJECTED DATA
208

FORMATTING THE FIRST PROJECTED DATA TO HAVE ONE OR MORE OF: A FIRST TYPE OF GRANULARITY, OR A SECOND TYPE OF GRANULARITY, OR A THIRD TYPE OF GRANULARITY, OR A FOURTH TYPE OF GRANULARITY, OR A FIFTH TYPE OF GRANULARITY
210

DETERMINING OR ACCESSING A SECOND COMPUTING MODEL ASSOCIATED WITH THE COMPUTING MODEL REPOSITORY
212

DETERMINING OR ACCESSING THE FIRST DATA COMPRISED IN THE METRIC DATA REPOSITORY AND SECOND DATA COMPRISED IN THE RECORD REPOSITORY THAT IS EXTERNAL TO THE COMPUTING STORAGE NETWORK
214

GENERATING, BASED ON THE SECOND COMPUTING MODEL, THE FIRST DATA COMPRISED IN THE METRIC DATA REPOSITORY AND THE SECOND DATA COMPRISED IN THE RECORD REPOSITORY THAT IS EXTERNAL TO THE COMPUTING STORAGE NETWORK, SECOND PROJECTED DATA
216

A

DATA MANAGEMENT SYSTEM 110

DATA MANAGEMENT SERVER 112

CONTROLLER 112a

CONTROLLER 112b

DATA ENGINE 140

DATA STORAGE SYSTEM 111

REPOSITORY 111a

REPOSITORY 111b

REPOSITORY 111c

REPOSITORY 111n

REPOSITORY 113

NETWORK 150

CLIENT APPLICATION 121

120a

120b

120c

120n

100

200a

ACTIVATING A COMPUTING STORAGE NETWORK, THE COMPUTING STORAGE NETWORK BEING COMMUNICATIVELY CONNECTED TO: A COMPUTING MODEL REPOSITORY; A METRIC DATA REPOSITORY; AND A RECORD REPOSITORY THAT IS EXTERNAL TO THE COMPUTING STORAGE NETWORK
202

DETERMINING A FIRST COMPUTING MODEL COMPRISED IN THE COMPUTING MODEL REPOSITORY
204

DETERMINING OR ACCESSING FIRST DATA COMPRISED IN THE METRIC DATA REPOSITORY
206

GENERATING, BASED ON THE FIRST COMPUTING MODEL, BASED ON THE FIRST DATA COMPRISED IN THE METRIC DATA REPOSITORY, FIRST PROJECTED DATA
208

FORMATTING THE FIRST PROJECTED DATA TO HAVE ONE OR MORE OF: A FIRST TYPE OF GRANULARITY, OR A SECOND TYPE OF GRANULARITY, OR A THIRD TYPE OF GRANULARITY, OR A FOURTH TYPE OF GRANULARITY, OR A FIFTH TYPE OF GRANULARITY
210

DETERMINING OR ACCESSING A SECOND COMPUTING MODEL ASSOCIATED WITH THE COMPUTING MODEL REPOSITORY
212

DETERMINING OR ACCESSING THE FIRST DATA COMPRISED IN THE METRIC DATA REPOSITORY AND SECOND DATA COMPRISED IN THE RECORD REPOSITORY THAT IS EXTERNAL TO THE COMPUTING STORAGE NETWORK
214

GENERATING, BASED ON THE SECOND COMPUTING MODEL, THE FIRST DATA COMPRISED IN THE METRIC DATA REPOSITORY AND THE SECOND DATA COMPRISED IN THE RECORD REPOSITORY THAT IS EXTERNAL TO THE COMPUTING STORAGE NETWORK, SECOND PROJECTED DATA
216

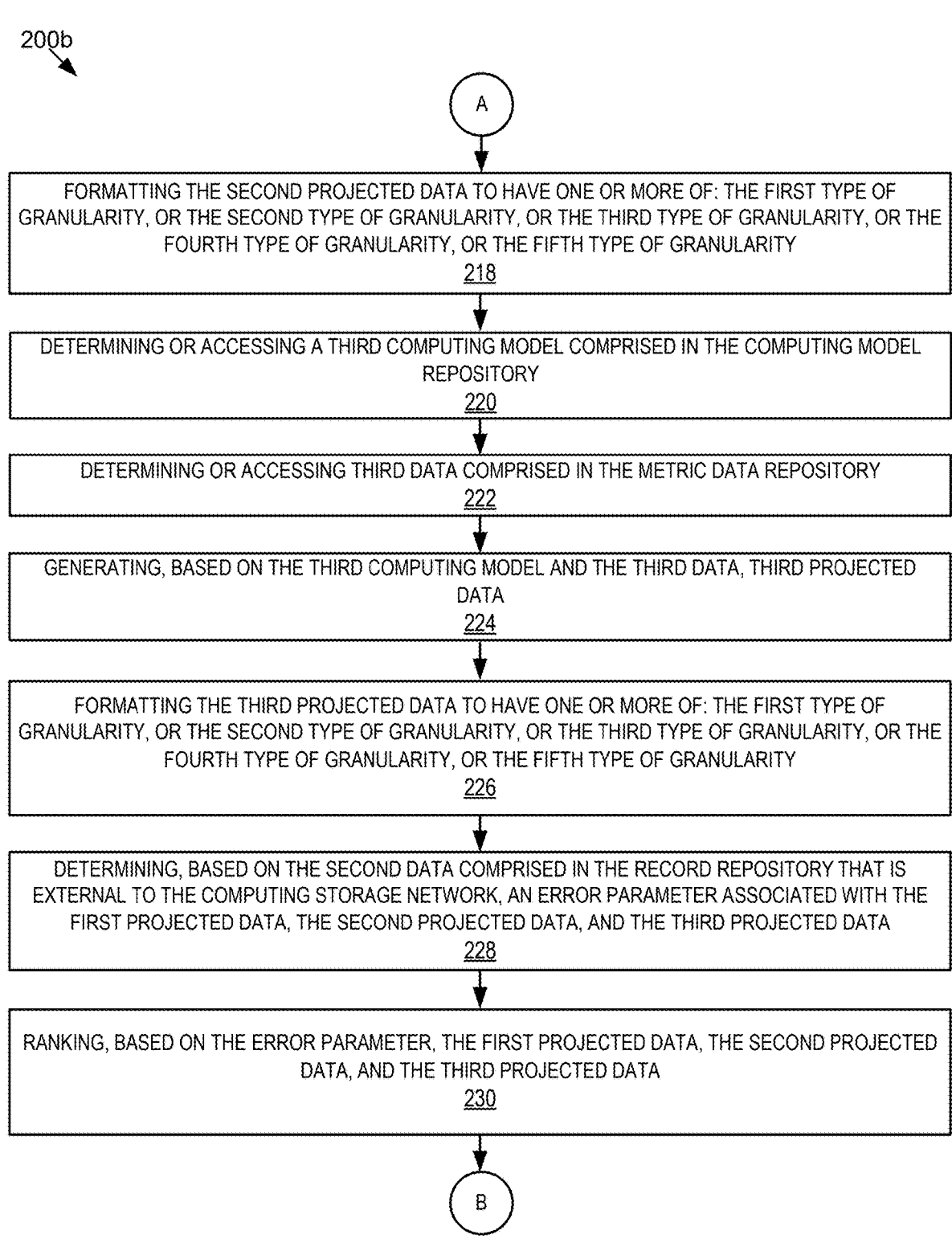

200b

A

FORMATTING THE SECOND PROJECTED DATA TO HAVE ONE OR MORE OF: THE FIRST TYPE OF GRANULARITY, OR THE SECOND TYPE OF GRANULARITY, OR THE THIRD TYPE OF GRANULARITY, OR THE FOURTH TYPE OF GRANULARITY, OR THE FIFTH TYPE OF GRANULARITY
218

DETERMINING OR ACCESSING A THIRD COMPUTING MODEL COMPRISED IN THE COMPUTING MODEL REPOSITORY
220

DETERMINING OR ACCESSING THIRD DATA COMPRISED IN THE METRIC DATA REPOSITORY
222

GENERATING, BASED ON THE THIRD COMPUTING MODEL AND THE THIRD DATA, THIRD PROJECTED DATA
224

FORMATTING THE THIRD PROJECTED DATA TO HAVE ONE OR MORE OF: THE FIRST TYPE OF GRANULARITY, OR THE SECOND TYPE OF GRANULARITY, OR THE THIRD TYPE OF GRANULARITY, OR THE FOURTH TYPE OF GRANULARITY, OR THE FIFTH TYPE OF GRANULARITY
226

DETERMINING, BASED ON THE SECOND DATA COMPRISED IN THE RECORD REPOSITORY THAT IS EXTERNAL TO THE COMPUTING STORAGE NETWORK, AN ERROR PARAMETER ASSOCIATED WITH THE FIRST PROJECTED DATA, THE SECOND PROJECTED DATA, AND THE THIRD PROJECTED DATA
228

RANKING, BASED ON THE ERROR PARAMETER, THE FIRST PROJECTED DATA, THE SECOND PROJECTED DATA, AND THE THIRD PROJECTED DATA
230

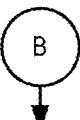

B

SELECTING, BASED ON THE RANKING, AT LEAST ONE OF THE FIRST PROJECTED DATA, THE SECOND
PROJECTED DATA, AND THE THIRD PROJECTED DATA
232

GENERATING, BASED ON SELECTING ONE OF THE FIRST PROJECTED DATA OR THE SECOND
PROJECTED DATA, A DIGITAL REPORT, WHEREIN THE DIGITAL REPORT INDICATES: DISPENSING
PROJECTION DATA OF A FIRST CONFIGURABLE DATA OBJECT ASSOCIATED WITH A FIRST SET OF USER
CATEGORIES, A SECOND SET OF USER CATEGORIES, OR A THIRD SET OF USER CATEGORIES; AND
PROTOCOL PROJECTION DATA OR PROCEDURE PROJECTION DATA ASSOCIATED WITH THE FIRST SET
OF USER CATEGORIES, THE SECOND SET OF USER CATEGORIES, OR THE THIRD SET OF USER
CATEGORIES
234

FIG. 2C

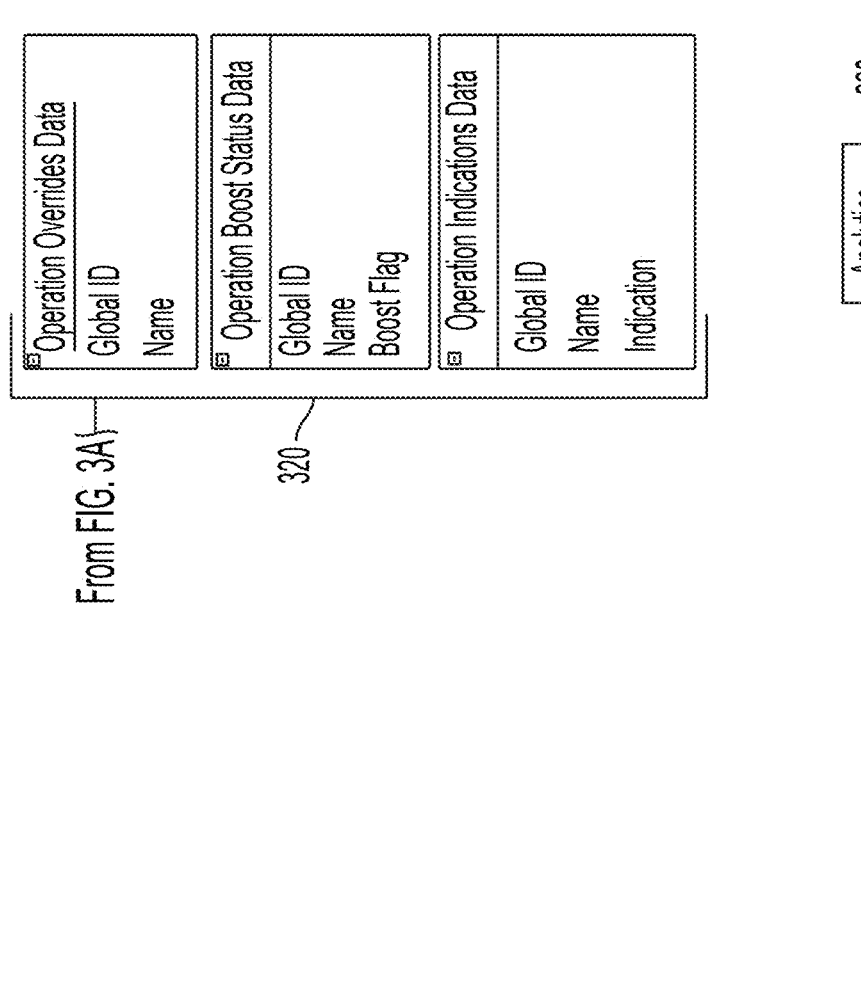
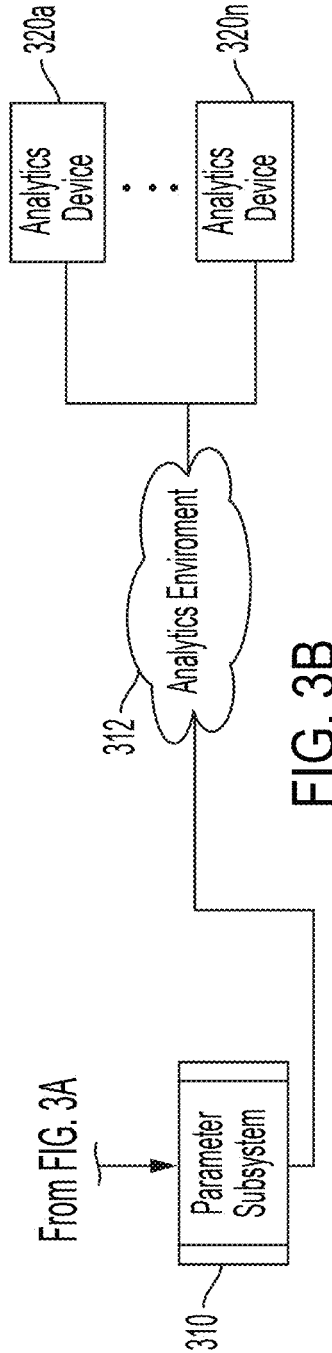
FIG. 3B

| Date | User Category | Configurable Data Object | Dispensing Strategy | Protocol Projection Data |
|------|---------------|--------------------------|---------------------|--------------------------|
| Date 1 | 1 | Data Object 1 | Strategy 1 | Protocol 1 |
| Date 2 | 2 | Data Object 2 | Strategy 2 | Protocol 2 |
| Date 3 | 3 | Data Object 1 | Strategy 1 | Protocol 1 |
| Date 4 | 4 | Data Object 3 | Strategy 3 | Protocol 3 |
| Date 5 | 5 | Data Object 4 | Strategy 4 | - |
| Date 6 | 6 | Data Object 3 | Strategy 4 | Protocol 4 |
| Date 7 | 7 | Data Object 5 | Strategy 5 | Protocol 5 |
| Date 8 | 8 | Data Object 6 | Strategy 3 | Protocol 3 |

FIG. 5

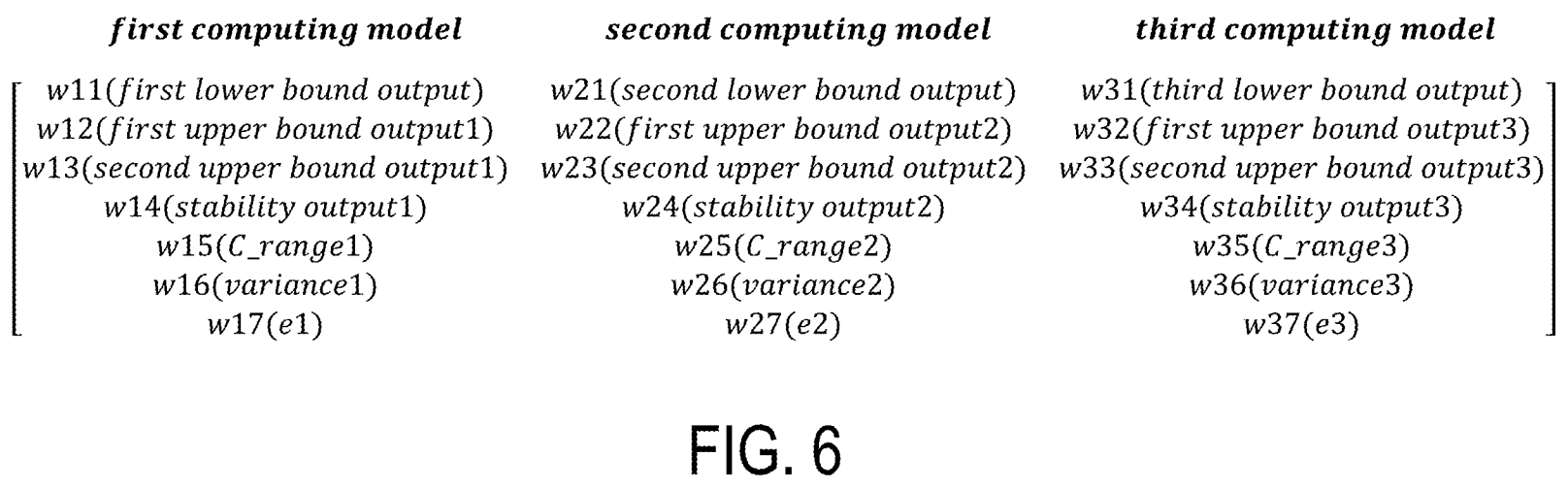

*first computing model* w11(*first lower bound output*)
w12(*first upper bound output1*)
w13(*second upper bound output1*)
w14(*stability output1*)
w15(*C_range1*)
w16(*variance1*)
w17(*e1*)

*second computing model* w21(*second lower bound output*)
w22(*first upper bound output2*)
w23(*second upper bound output2*)
w24(*stability output2*)
w25(*C_range2*)
w26(*variance2*)
w27(*e2*)

*third computing model* w31(*third lower bound output*)
w32(*first upper bound output3*)
w33(*second upper bound output3*)
w34(*stability output3*)
w35(*C_range3*)
w36(*variance3*)
w37(*e3*)

FIG. 6

ERROR PARAMETER GENERATION AND UTILIZATION FOR DATA PROJECTIONS IN A COMPUTING STORAGE NETWORK

CROSS-REFERENCE TO RELATED APPLICATIONS

This application claims priority to U.S. Provisional Application No. 63/781,684, filed on Apr. 1, 2025, the disclosure of which is incorporated herein by reference in its entirety for all purposes.

TECHNICAL FIELD

This disclosure is directed to generating an error parameter for configuring or optimizing computing models in a computing storage network.

BACKGROUND

A complex computing storage system or network can have a plurality of computing models. The plurality of computing models, for example, can ingest data and generate outputs that are usable for myriad computing operations. In some cases, the data ingested by these models can originate from a plurality of sources which can affect the types of output generated by the computing models. Furthermore, the ingested data, can also affect model performance of the computing models in question which can indicate whether a given computing model is performant or non-performant.

There is therefore a need to analyze projection data generated by computing models in a computing storage network with attendant error parameter data that can inform: accuracy of data projections from said computing models; and/or configuration settings that are useable to optimize or update model parameters of said computing models.

SUMMARY

This disclosure is directed to methods, systems, and computer program products for error parameter generation and utilization for data projections in a computing storage network. According to an embodiment, a method for error parameter generation and utilization for data projections in a computing storage network comprises: activating, a computing storage network, the computing storage network being communicatively connected to: a computing model repository, a metric data repository, and a record repository that is external to the computing storage network; determining a first computing model comprised in the computing model repository; determining or accessing first data comprised in the metric data repository; generating, based on the first computing model and based on the first data comprised in the metric data repository, first projected data; formatting the first projected data to have one or more of: a first type of granularity, or a second type of granularity, or a third type of granularity, or a fourth type of granularity, or a fifth type of granularity; determining or accessing a second computing model associated with the computing model repository; determining or accessing the first data comprised in the metric data repository and second data comprised in the record repository that is external to the computing storage network; generating based on the second computing model and the first data comprised in the metric data repository and the second data comprised in the record repository that is external to the computing storage network, second projected data; formatting the second projected data to have one or more of: the first type of granularity, or the second type of granularity, or the third type of granularity, or the fourth type of granularity, or the fifth type of granularity; determining or accessing a third computing model comprised in the computing model repository; determining or accessing third data comprised in the metric data repository; generating, based on the third computing model and the third data, third projected data; formatting the third projected data to have one or more of: the first type of granularity, or the second type of granularity, or the third type of granularity, or the fourth type of granularity, or the fifth type of granularity; determining, based on the second data comprised in the record repository that is external to the computing storage network, an error parameter associated with the first projected data, the second projected data, and the third projected data; ranking, based on the error parameter, the first projected data, the second projected data, and the third projected data; selecting, based on the ranking, at least one of the first projected data, the second projected data, and the third projected data; generating, based on selecting one of the first projected data or the second projected data, a digital report, wherein the digital report indicates: dispensing projection data of a first configurable data object associated with a first set of user categories, a second set of user categories, or a third set of user categories, and protocol projection data or procedure projection data associated with the first set of user categories, the second set of user categories, or the third set of user categories.

In another embodiment, a system and a computer program product can include or execute the method described above. These and other implementations may each optionally include one or more of the following features.

According to one embodiment: the first type of granularity can be based on protocol provider data; the second type of granularity can be based on protocol entity data; the third type of granularity can be based on first location data associated with the protocol provider data or protocol entity data; the fourth type of granularity can be based on second location data associated with the protocol provider data or protocol entity data; or the fifth type of granularity can be based on third location data associated with the protocol provider data or the protocol entity data.

Furthermore, the above method can further comprise: determining the first set of user categories or the second set of user categories or the third set of user categories; extracting: first quantitative data from the first projected data, second quantitative data from the second projected data, and third quantitative data from the third projected data; ranking, based on the error parameter, the first quantitative data, the second quantitative data, and the third quantitative data; selecting based on the ranking of the first quantitative data, the second quantitative data, and the third quantitative data, one of the first projected data, the second projected data, and the third projected data; and generating based on selecting one of the first projected data, the second projected data, or the third projected data, the digital report.

According to one embodiment, the error parameter is determined or estimated based on computationally mapping: a first data element comprised in the first quantitative data to a second data element comprised in the second quantitative data, thereby generating first mapped data; a second data element comprised in the first quantitative data to a third data element comprised in the third quantitative data thereby generating second mapped data; and the second data element comprised in the second quantitative data to the third data element comprised in the third quantitative data thereby generating third mapped data.

In some embodiments, the error parameter is determined based on at least a data discrepancy between one or more of: the first mapped data and the second mapped data; the first mapped data and the third mapped data; or the second mapped data and the third mapped data.

Additionally, the first computing model, the second computing model, or the third computing model can be parameterized based on one or more of: a first parameter, a second parameter, and a third parameter.

Moreover, the metric data repository can comprise one or more of: efficacy data associated with the first configurable data object, first protocol data associated with the first configurable data object, second protocol data associated with a second configurable data object, and third protocol data.

It is appreciated that the protocol projection data or procedure projection data comprises a procedure associated with the first set of user categories or the second set of user categories.

It is further appreciated that the secure storage network can be comprised in a cloud computing platform.

According to one embodiment, the above method further comprises: generating, based on the first projected data, a first set of metrics including a first data value associated with the error parameter; generating, based on the second projected data, a second set of metrics including a second data value associated with the error parameter; generating, based on the third projected data, a third set of metrics including a third data value associated with the error parameter; combining data elements of the first set of metrics to generate first fail rate data for the first computing model; combining data elements of the second set of metrics to generate second fail rate data associated with the second computing model; combining data elements of the third set of metrics to generate third fail rate data associated with the third computing model; determining, based on the first fail rate data, the second fail rate data, and the third fail rate data, that: a first quantitative value of the first fail rate data is smaller than a second quantitative value of the second fail rate data, or the first quantitative value of the first fail rate data is smaller than a third quantitative value of the third fail rate data; selecting, based on the determining, that the first computing model is a performant computing model; and generating, based on the selecting, the digital report based on the first projected data.

Furthermore, the first set of metrics or the second set of metrics or the third set of metrics can be based on a first parameter, a second parameter, a third parameter, a fourth parameter, a fifth parameter, a sixth parameter, or the error parameter.

In some instances, the first parameter comprises a lower bound data controller configured to enable verifying that the first projected data or the second projected data or the third projected data is bound by a minimum threshold value.

Moreover, the second parameter comprises a first upper bound data controller configured to determine whether the first projected data or the second projected data or the third projected data is constrained by a jurisdiction-based upper limit data.

In addition, the third parameter comprises a second upper bound data controller configured to determine whether the first projected data or the second projected data or the third projected data is constrained by an entity-based upper limit data.

In some cases, the fourth parameter comprises a stability data controller configured to set boundary conditions for one or more data values comprised in the first projected data, the second projected data, and the third projected data.

It is appreciated that the fifth parameter comprises a confidence interval data controller configured to assess the first projected data, the second projected data, and the third projected data thereby determining that a data value range used to estimate the first projected data, the second projected data, or the third projected data is within an expected value range.

It is further appreciated that the sixth parameter comprises a variance data controller configured to determine by how much: a first datapoint comprised in the first projected data deviates from a first average value of the first projected data; or a second datapoint comprised in the second projected data deviates from a second average value of the second projected data; or a third data point comprised in the third projected data deviates from a third average data value of the third projected data.

BRIEF DESCRIPTION OF THE DRAWINGS

The disclosure is illustrated by way of example, and not by way of limitation in the figures of the accompanying drawings in which like reference numerals are used to refer to similar elements. It is appreciated that various features may not be drawn to scale and the dimensions of various features may be arbitrarily increased or reduced for clarity of discussion. Further, some components may be omitted in certain figures for clarity of discussion.

FIGS. 2A, 2B and 2C show exemplary workflows for error parameter generation and utilization for data projections in a computing storage network.

FIGS. 3A and 3B illustrate exemplary data interconnection system associated with generating metric data for driving electronic communications, according to some embodiments.

FIG. 5 shows an exemplary table comprised in the disclosed digital report which is generated based on one or more computing models in the computing model repository, according to some embodiments.

FIG. 6 shows an exemplary model efficiency function or model efficiency matrix which aggregates one or more data outputs associated with applying the foregoing quality control parameters/metrics.

Although similar reference numbers for the foregoing drawings may be used to refer to similar elements for convenience, it is appreciated that each of the various exemplary embodiments may be considered to be distinct variations.

As used in this disclosure, the terms "embodiment," "example embodiment," "exemplary embodiment," "implementation," and the like do not necessarily refer to a single embodiment, although it may, and various example embodiments may be readily combined and interchanged, without departing from the scope or spirit of the present disclosure. Furthermore, the terminology used herein is for the purpose of describing example embodiments only and are not intended to be limitations. In this respect, as used herein, the term "in" may include "in" and "on," and the terms "a," "an" and "the" may include singular and plural references.

Furthermore, as used herein, the term "by" may also mean "from," depending on the context. Furthermore, as used herein, the term "if" may also mean "when" or "upon," depending on the context. Furthermore, as used herein, the words "and/or" may refer to and encompass any and all possible combinations of one or more of the associated listed items.

DETAILED DESCRIPTION

Reference will now be made to various embodiments, examples of which are illustrated in the accompanying drawings and figures. In the following detailed description, numerous specific details are set forth in order to provide a thorough understanding of this disclosure. However, it will be apparent to one of ordinary skill in the art that the disclosure may be practiced without these specific details. In some instances, well-known methods, processes, components, systems, and networks have not been described in detail so as not to unnecessarily obscure aspects of the disclosed embodiments.

Network Environment

Figure 1A:
FIG. 1A illustrates an exemplary secure storage system/ network within which the present technology may be implemented, according to some embodiments of this disclosure.

FIG. 1A illustrates an exemplary secure storage system/ network 100 within which the present technology may be implemented. As shown, the secure storage system 100 may include a data management system 110 and a plurality of user computing devices 120a, 120b, . . . 120n coupled to each other via a network 150.

The data management system 110 may include a data storage system 111 and a data management server 112. The data storage system 111 may have one or more secure repositories 111a, 111b, 111c, . . . 111n. Each of the one or more secure repositories 111a, 111b, 111c, . . . 111n may comprise two or more secure storage structures configured to store, at least index data and/or file data, and/or record data as the case may require. According to one embodiment, the index data and/or file data, and/or record data may be associated with health facility, a research facility, a governmental agency, an educational institution, etc. In some cases, the data storage system 111 comprises secure data structures and/or computing storage structures that securely store data indices, files associated with said data indices, and/or records associated with said data indices. According to one embodiment, the various secure repositories 111a, 111b, 111c, . . . 111n can be regarded as native or internal to the data management system 100 and can comprise one or more of a computing model repository, and a metric data repository.

It is appreciated that the secure storage system 100 (e.g., also referred to as a computing network system elsewhere herein) may include or be communicatively connected to one or more non-native or external databases or data repositories such as data repository 113 (e.g., record repository elsewhere herein).

The network 150 may include one or more types of communication networks such as a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 120a, . . . 120n may be any machine or system that is used by a user to access the data management system 110 via the network 150, and may comprise computing devices including laptop computers, desktop computers, mobile phones, smart phones, tablet computers, and netbooks. A client application 121 (e.g., a secure interface) associated with the data management system 110 may be run from a user computing device (e.g., 120a) to securely access data in the data management system 110 via the network 150.

The data storage system 111 may store data that client applications (e.g., client application 121) in user computing devices 120a . . . 120n may access. Furthermore, the data storage system 111 may comprise any commercially available storage devices.

According to one embodiment, each content repository (e.g., 111a, 111b, 111c, . . . or 111n) may store one or more data categories such that one or more users may be provided access to the one or more data categories based on context data associated with the one or more users and/or context data associated with the one or more data categories.

It is appreciated that the disclosed content repositories 111a, 111b, 111c, . . . 111n may comprise separate logic sections in the same storage device. According to one embodiment, content data stored in the content repositories 111a, 111b, 111c, . . . 111n may comprise controlled content stored in specialized databases including at least one source of truth database within said repositories such that specific users and/or specific computing devices may be provided credential access to said repositories based on one or more profiles of the specific users and/or specific devices previously stored or otherwise associated with the data management system 110.

According to one embodiment, each of the content repositories 111a, 111b, 111c, . . . 111n can be implemented as one or more computer-readable or machine-readable storage media that are non-transitory. In some embodiments, the content repositories 111a, 111b, 111c, . . . 111n may be distributed within and/or across multiple internal and/or external enclosures of a computing system and/or additional computing systems. Furthermore, each of the content repositories 111a, 111b, 111c, . . . 111n may comprise one or more similar or dissimilar forms of memory including semiconductor memory devices such as dynamic or static random access memories (DRAMs or SRAMs), erasable and programmable read-only memories (EPROMs), electrically erasable and programmable read-only memories (EE-PROMs) and flash memories; magnetic disks; optical media such as compact disks (CDs) or digital video disks (DVDs), BluRays or other types of optical media; or other types of storage devices.

The data management server 112 may comprise a remote computer system accessible over a remote or local network, such as the network 150. The data management server 112 may store a data management controller 112a and a data collection controller 112b for controlling management and collection of the data. The data management server 112 could be any commercially available computing devices. Although only one server is shown, it is appreciated that the data management system 110 may have a plurality of servers such that the controllers 112a and 112b may be in separate servers. A client application (e.g., client application 121) may be active on one or more user computing devices 120a, . . . , 120n. The corresponding server application may be active on the data management server 112. The client application and the corresponding server application may communicate with each other over the network 150 and thereby provide distributed functionality and allow multiple client applications to take advantage of the information-gathering capabilities of the data management system 110.

Figure 1B:
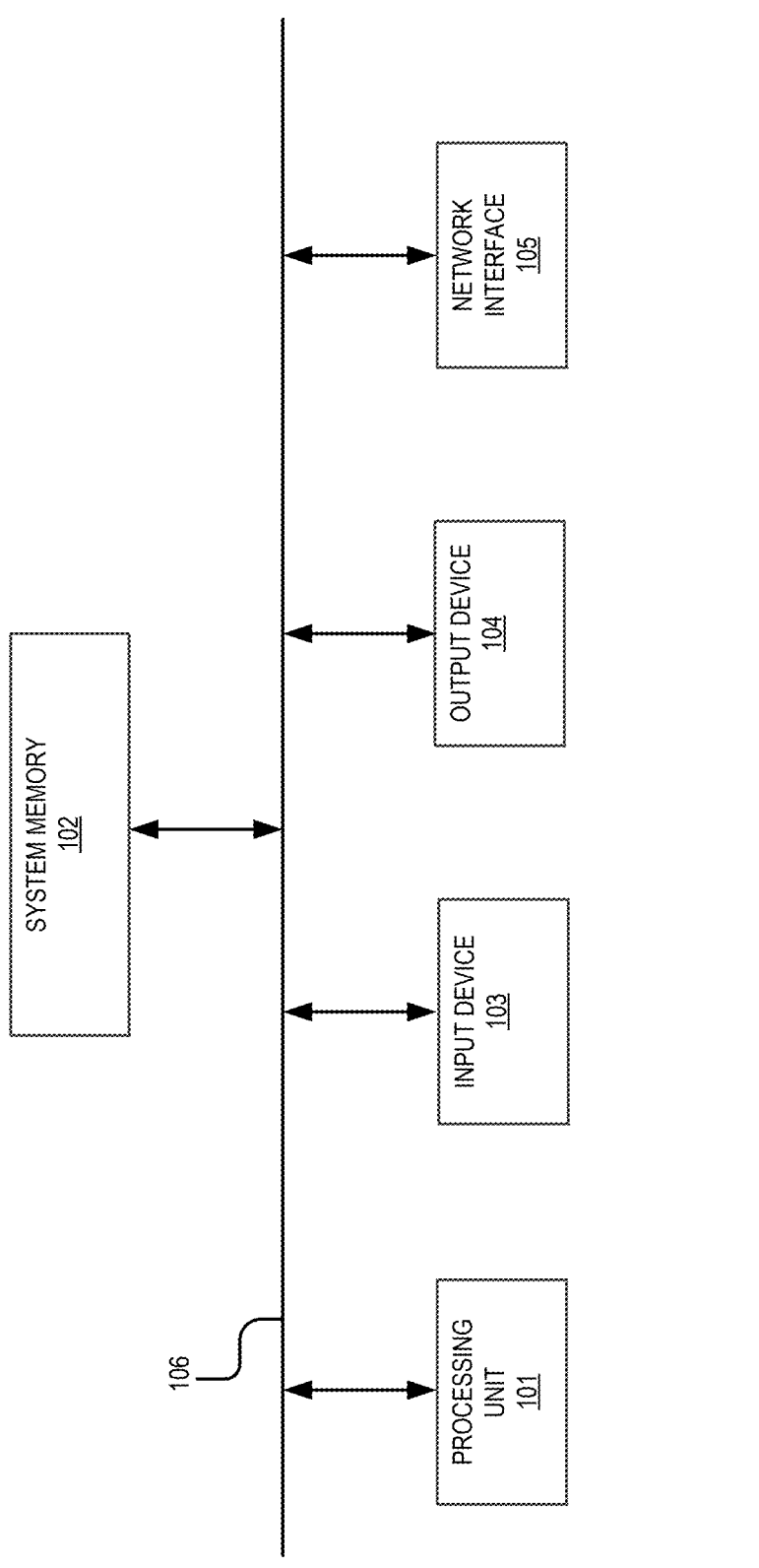
FIG. 1B illustrates an example block diagram of a computing device within which one or more systems or devices of FIG. 1A can be implemented, according to some embodiments of this disclosure.
Figure 1C:
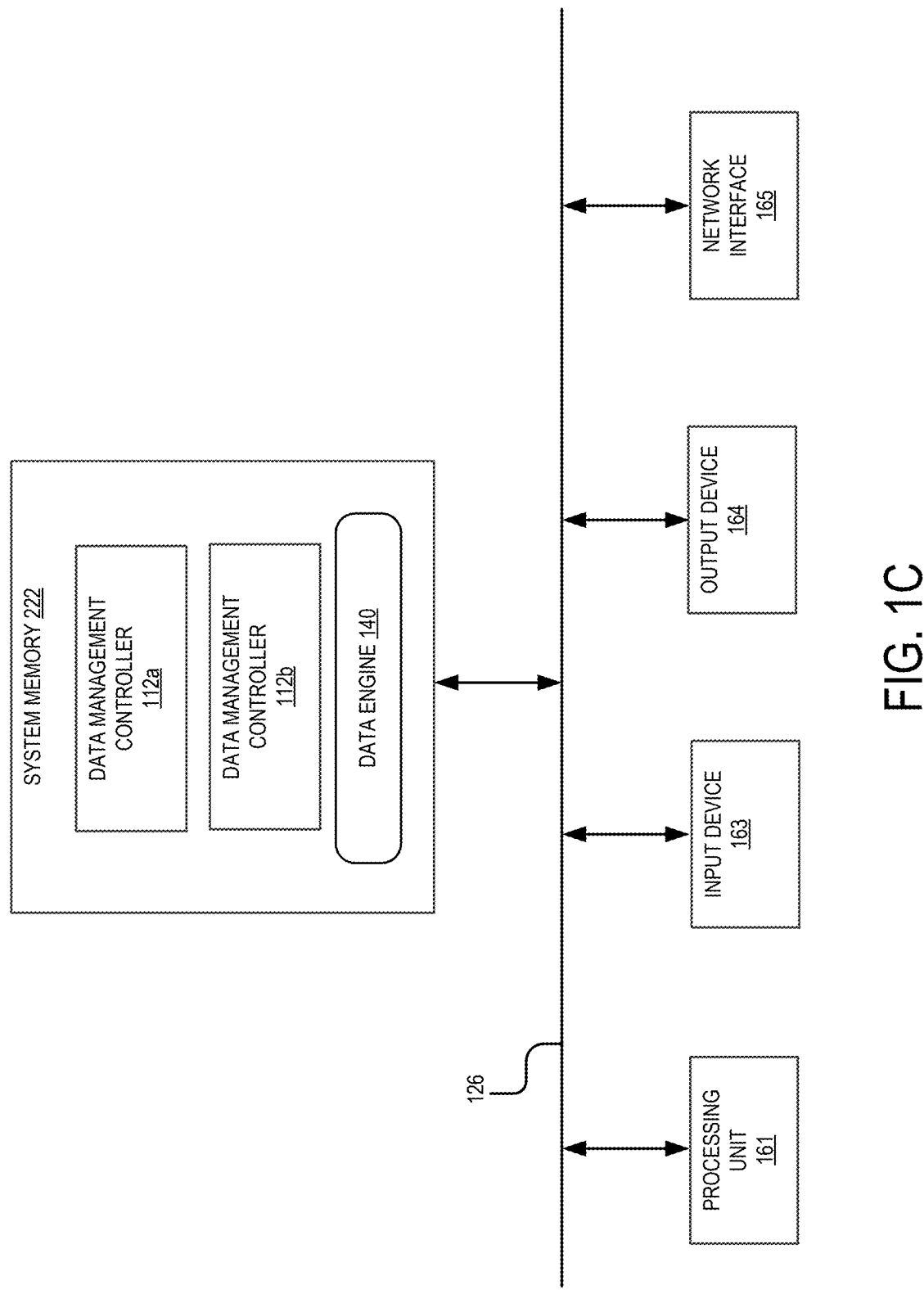
FIG. 1C illustrates an example high level block diagram of the data management system of FIG. 1A, according to some embodiments of this disclosure.

The data engine 140 shown within the data management system 110 may include instructions stored in a system memory (e.g., memory 222 of FIG. 1C) that are executed by one or more computing device processors (e.g., processing unit 161 of FIG. 1C). The instructions may include various operations or processes discussed below in association with, for example, one or more task protocols, and/or one or more data routing computing operations, and/or one or more data correlation or data relation computing operations.

In one embodiment, the secure storage system 100 may be used for collecting and managing data (e.g., index data, file data, record data, file or record data associated with a trial, file or record data associated with a research, health file or record data, etc.). For example, a first repository (e.g., repository 111*a*) of the secure storage system 100 may store electronic records or electronic files or index data as the case may require. In some cases, the electronic records comprise electronic data capture (EDC) data and/or trial source data (e.g., associated with a subject), and/or inquiry data, and/or quality control data, and/or safety data, etc. It is appreciated that a trial as described in this disclosure may refer to a clinical trial.

The data management system 110 may have: one or more interfaces for receiving the plurality of data described herein (e.g., a plurality of data from a plurality of similar or dissimilar data sources including telephonic data sources, email data sources, text-messaging data sources, video-conferencing data sources, voice over Internet Protocol data sources, etc.); database or query mechanisms for operating on the plurality of data; and one or more reporting tools for analysis of the plurality of data.

Furthermore, each of the content repositories 111*a*, 111*b*, 111*c*, . . . or 111*n* may be used by a plurality of sites (e.g., a hospital site, a school site, a research site, a pharmaceutical company site, etc.) to store the plurality of data provided in this disclosure. In one embodiment, the plurality of data comprises source data (e.g., vital statistics data such as blood pressure values, research results values, chemical analysis values, biographic data, bibliographic data, demographic data, test data, etc.) which may be converted to EDC data automatically, and then stored in one or more of the content repositories 111*a*, 111*b*, 111*c*, . . . or 111*n*. It is appreciated that the EDC data stored in the various content repositories 111*a*, 111*b*, 111*c*, . . . or 111*n* may be synchronized to ensure that data inconsistencies do not creep into any of the content repositories 111*a*, 111*b*, 111*c*, . . . or 111*n*. It is further appreciated that each of the content repositories 111*a*, 111*b*, 111*c*, . . . or 111*n* may have two or more data storage structures.

In one embodiment, the data management system 110 may comprise a multi-tenant system where various elements of hardware and software are shared by one or more users. For instance, the data management server 110 may simultaneously and securely process requests from a plurality of users, and the data storage system 111 may securely store controlled or secure content for the plurality of users.

In one embodiment, the data management system 110 may run on a cloud computing platform. Users of said cloud computing platform can access the controlled content comprised in the cloud computing platform independently by using, for example, a virtual machine image, or acquiring access to a service maintained by a cloud database provider associated with the secure storage system 100. In one embodiment, the data management system 110 may be provided as Software as a Service ("SaaS") to allow users to access the data management system 110 with, for example, a thin client.

FIG. 1B illustrates an example block diagram of a computing device which can be used as the computing devices 120*a*, . . . , 120*n*, and the data management system 110 of FIG. 1A. The illustrated computing device is only one example of a suitable computing environment and is not intended to suggest any limitation as to scope of use or functionality. The computing device of FIG. 1B may include a processing unit 101, a system memory 102, an input device 103, an output device 104, a network interface 105, and a system bus 106 that couples these components to each other.

The processing unit 101 may be configured to execute computer instructions or computing operations that are stored in a computer-readable medium, for example, the system memory 102. The processing unit 101 may comprise a central processing unit (CPU).

The system memory 102 can include a variety of computer readable media which may be any available media accessible by the processing unit 101. For instance, the system memory 102 may include computer storage media in the form of volatile and/or non-volatile memory such as read only memory (ROM) and/or random-access memory (RAM). By way of example, but not limitation, the system memory 102 may store instructions and data including an operating system, program sub-systems, various application programs, and program data.

A user can enter computing commands and/or information to the computing device of FIG. 1B through the input device 103. The input device 103 may comprise a keyboard, a touchscreen input device, a touch pad, a mouse, a microphone, and/or an electronic pen and/or some other input computing device.

The computing device of FIG. 1B may provide output data via the output device 104 which may comprise a monitor, a display device (e.g., a display screen of a tablet, cell phone, etc.), a speaker, a printer, or some other output computing device.

The computing device of FIG. 1B, through the network interface 105, may operate in a networked or distributed environment using logical connections to one or more other computing devices, which may be a personal computer (PC), a server, a router, a network PC, a peer device, a smart phone, or any other media consumption or transmission computing device, and may include any or all of the elements described above. The logical connections may include a network (e.g., the network 150) and/or buses. The network interface 105 may be configured to allow the computing device of FIG. 1B to transmit and receive data in a network, for example, the network 150. The network interface 105 may include one or more network interface cards (NICs). It is appreciated that the computing device of FIG. 1B could comprise a stationary computing device or a mobile computing device.

FIG. 1C illustrates an example high level block diagram of the data management server 112 according to one embodiment of the present disclosure. The data management server 112 may be implemented by the computing device such as the computing device of FIG. 1B, and may have a processing unit 161, a system memory 222, an input device 163, an output device 164, and a network interface 165, coupled to each other via a system bus 126.

The system memory 222 may comprise data management controllers 112*a* and 112*b*. In one embodiment, the data management controllers 112*a* and 112*b* may be comprised in one or more applications including a web application or a Java application. In addition, the data management controllers 112*a* and 112*b* may be configured to receive and/or store the plurality of data disclosed.

The system memory 222 may also include a data engine 140 or one or more data engines 140 stored in the memory device 22 and which cause a computer processor to execute the various processing stages of at least FIGS. 2A, 2B, and 2C as further discussed below. For example, the flowchart of FIGS. 2A, 2B, and 2C may be executed using the data engine 140 or a data processing module (e.g., computing module) stored in memory 222 such that the data engine 140 includes instructions that are executed by one or more processing units 161 to implement at least the flowchart of FIGS. 2A, 2B, and 2C.

According to some embodiments, the disclosed secure storage system is comprised in a cloud content management platform. The cloud content management platform, for example, can host a suite of data management and/or data analysis applications including: a data safety application associated with the secure storage system; an electronic data capture (EDC) application associated with the secure storage system; a data quality application associated with the secure storage system; and a data inquiries application associated with the secure storage system 100.

Exemplary Workflow

FIGS. 2A, 2B, and 2C show exemplary workflows for error parameter generation and utilization for data projections in a computing storage network. It is appreciated that one or more data engines stored in a memory device may cause a computer processor to execute the various processing stages of the workflows of FIGS. 2A and 2B. For example, the disclosed techniques may be implemented as one or more data engines comprised in a computing storage network that is optimized to store and/or process data associated with a plurality of user categories and/or digital profiles and/or computing models.

At block 202, the one or more data engines may activate a computing storage network. The computing storage network, for example, may be communicatively connected or coupled to one or more of: a computing model repository; a metric data repository; and a record repository that is external to the computing storage network. In one embodiment, data that is native to, or internal to the computing storage network comprises analytics data including data that is processed or generated or otherwise organized within one or more databases or data repositories comprised in the computing storage network. Furthermore, activating the computing storage network may comprise electrically initializing one or more computing models and/or computing devices and/or databases associated with the computing storage data. Furthermore, activating the computing storage network may include detecting or determining that one or more computing devices and/or databases or data repositories associated with the computing storage network are on, or are otherwise optimally operating to allow various computing operations such as those discussed herein to be performed.

At block 204, the one or more data engines may determine or access a first computing model comprised in the computing model repository. Furthermore, the one or more data engines may determine or access first data comprised in the metric data repository as indicated at block 206. In addition, the one or more data engines may also generate, at block 208, based on the first computing model and based on the first data comprised in the metric data repository, first projected data. It is appreciated that the one or more data engines may also format, at block 210, the first projected data to have one or more of: a first type of granularity, or a second type of granularity, or a third type of granularity, or a fourth type of granularity, or a fifth type of granularity.

At block 212, the one or more data engines may determine or access a second computing model associated with the computing model repository. Moreover, the one or more data engines may also determine or access the first data comprised in the metric data repository and second data comprised in the record repository that is external to the computing storage network as shown at block 214. Furthermore, the one or more data engine may generate, at block 216, based on the second computing model, the first data comprised in the metric data repository and the second data comprised in the record repository that is external to the computing storage network, second projected data. It is appreciated that the one or more data engines may format, at block 218, the second projected data to have one or more of: the first type of granularity, or the second type of granularity, or the third type of granularity, or the fourth type of granularity, or the fifth type of granularity.

Turning to block 220, the one or more data engines may determine or access a third computing model comprised in the computing model repository. At block 222 the one or more data engines may determine or access third data comprised in the metric data repository. In addition, the one or more data engines may generate, at block 224, based on the third computing model and the third data, third projected data. It is appreciated that the third data may be formatted, as indicated at block 226, to have one or more of: the first type of granularity, or the second type of granularity, or the third type of granularity, or the fourth type of granularity, or the fifth type of granularity.

At block 228, the one or more data engines may determine (e.g., estimate), based on the second data comprised in the record repository that is external to the computing storage network, an error parameter associated with the first projected data, the second projected data, and the third projected data. The error parameter, for example, may comprise a quantitative or qualitative indicator that indicates or controls a rate of deviation (e.g., deviation beyond a first threshold amount or a second threshold amount, or a third threshold) of the first projected data, the second projected data, or the third projected data as the case may require. In one embodiment, the error parameter beneficially enables determining an amount or quantity indicating deviation data associated with the first projected data, the second projected data, or the third projected data.

At block 230, the one or more data engines may rank, based on the error parameter, the first projected data, the second projected data, and the third projected data. In addition, the one or more data engines select, at block 232, based on the ranking, at least one of the first projected data, the second projected data, and the third projected data.

At block 234, the one or more data engines may generate, based on selecting one of the first projected data or the second projected data, a digital report, wherein the digital report indicates: dispensing projection data of a first configurable data object associated with a first set of user categories, a second set of user categories, or a third set of user categories; and/or protocol projection data or procedure projection data associated with the first set of user categories, the second set of user categories, or the third set of user categories.

It is appreciated that the various levels of granularity indicate view levels associated with formatting and/or viewing the digital report. It is further appreciated that the various types or levels of granularity referenced above beneficially enable organizing or structuring data from a jurisdictional perspective, an organizational perspective, a protocol perspective, or a procedural perspective. For example: the first type of granularity can be based on protocol provider data (e.g., data associated with a healthcare provider); the second type of granularity can be based on protocol entity data (e.g., data associated with an entity or organization); the third type of granularity can be based on first location data associated with the protocol provider data or protocol entity data; the fourth type of granularity can be based on second location data associated with the protocol provider data or protocol entity data; or the fifth type of granularity can be based on third location data associated with the protocol provider data or the protocol entity data.

In one embodiment the error parameter is applied to correct, improve, optimize, configure, or edit a model parameter of one or more of: the first computing model; the second computing model; or the third computing model. In effect, the error parameter can be used to generate configuration settings that are useable to optimize or update or revise or edit model parameters of at least the first computing model, the second computing model, the third computing model, or a fourth computing model comprised in the computing model repository.

Furthermore, the one or more data engines can further: determine, the first set of user categories or the second set of user categories or the third set of user categories; extract: first quantitative data from the first projected data, second quantitative data from the second projected data, and third quantitative data from the third projected data; rank, based on the error parameter, the first quantitative data, the second quantitative data, and the third quantitative data; select, based on the ranking of the first quantitative data, the second quantitative data, and the third quantitative data, one of the first projected data, the second projected data, and the third projected data; and generate, based on selecting one of the first projected data, the second projected data, or the third projected data, the digital report.

According to one embodiment, the error parameter is determined (e.g., estimated) based on computationally mapping: a first data element comprised in the first quantitative data to a second data element comprised in the second quantitative data, thereby generating first mapped data; a second data element comprised in the first quantitative data to a third data element comprised in the third quantitative data thereby generating second mapped data; and the second data element comprised in the second quantitative data to the third data element comprised in the third quantitative data thereby generating third mapped data.

Furthermore, the error parameter can be determined based on at least a data discrepancy between one or more of: the first mapped data and the second mapped data; the first mapped data and the third mapped data; or the second mapped data and the third mapped data.

In some cases, the digital report is configured or adapted for one or more of: controlling data elements in a targeted data communication within or without the computing storage network; determining a first dispensing strategy (e.g., strategy data) associated with the first configurable data object; determining a second dispensing strategy (e.g., strategy data) associated with the first configurable data object or a second configurable data object; developing a first implementation strategy (e.g., implementation data) based on at least the protocol projection data or procedure data; or developing a second implementation strategy (e.g., implementation data) based on the protocol projection data or procedure data.

In some instances, the first computing model, the second computing model, or the third computing model is parameterized based on one or more of: a first parameter; a second parameter; and a third parameter.

According to one embodiment, the metric data repository comprises one or more of: efficacy data associated with the first configurable data object; first protocol data associated with the first configurable data object; second protocol data associated with a second configurable data object; and third protocol data.

In addition, the efficacy data, associated with the first configurable data object, can be determined using one or more sensors that capture bio-indication data. Bio-indication data may comprise captured sensor data that indicate vital signs data associated with a user profile.

Moreover, the first protocol data associated with the first configurable data object can comprise a data measurement associated with a procedure linked to the first configurable data object. Also, the second protocol data associated with the second configurable data object can comprise a data measurement associated with a procedure linked to the second configurable data object. A data measurement being linked to a configurable data object (e.g., first configurable data object or second configurable data object) can indicate that the data measurement is comprised in a procedure or protocol associated with the configurable data object.

Furthermore, data comprised in, or associated with the metric data repository can include, or be derived from: composition/drug code data (e.g., National Drug Codes (NDCs)); temporal data associated with dispensing a composition/drug and/or implementing a procedure or process associated with the composition/drug; diagnostic code data indicating one or more identifiers associated with a composition/drug and/or procedure that is dependent on, or independent of the composition/drug; national provider identifier (NPI) data; location data associated with a dispensing strategy or a protocol implementation strategy.

In exemplary implementations, the data comprised in the metric data repository comprises data derived from transactions associated with: dispensing of compositions represented by the first configurable data object; or implementing a procedure that is dependent or independent of the first configurable data object and/or a second configurable data object. In some implementations, the metric data repository comprises data (e.g., cross-channel data) aggregated from one or more of: a telephonic data channel; an email data channel; a text-messaging data channel; a video-conferencing data channel; or a voice over Internet Protocol data channel.

Furthermore, the protocol projection data or procedure projection data can comprise a procedure (e.g., a health procedure) associated with the first set of user categories or the second set of user categories.

It is appreciated that the secure storage network is comprised in a cloud computing platform.

According to one embodiment, a computing model as used herein comprises a digital construct or template used by a computing system to generate output data. For example, the computing model may be used for one or more of data analysis computing operations, data simulation computing operations, data design computing operations, data prediction or estimation computing operations, etc. As such a computing model as used herein can ingest data to execute one or more of the foregoing computing operations.

According to one embodiment, the above method further comprises: generating, based on the first projected data, a first set of metrics including a first data value associated with the error parameter; generating, based on the second projected data, a second set of metrics including a second data value associated with the error parameter; generating, based on the third projected data, a third set of metrics including a third data value associated with the error parameter; combining data elements of the first set of metrics to generate first fail rate data for the first computing model; combining data elements of the second set of metrics to generate second fail rate data associated with the second computing model; combining data elements of the third set of metrics to generate third fail rate data associated with the third computing model; determining, based on the first fail rate data, the second fail rate data, and the third fail rate data, that: a first quantitative value of the first fail rate data is smaller than a second quantitative value of the second fail rate data, or the first quantitative value of the first fail rate data is smaller than a third quantitative value of the third fail rate data; selecting, based on the determining, that the first computing model is a performant computing model; and generating, based on the selecting, the digital report based on the first projected data.

Furthermore, the first set of metrics or the second set of metrics or the third set of metrics can be based on a first parameter, a second parameter, a third parameter, a fourth parameter, a fifth parameter, a sixth parameter, or the error parameter.

In some instances, the first parameter comprises a lower bound data controller configured to enable verifying that the first projected data or the second projected data or the third projected data is bound by a minimum threshold value.

Moreover, the second parameter comprises a first upper bound data controller configured to determine whether the first projected data or the second projected data or the third projected data is constrained by a jurisdiction-based upper limit data.

In addition, the third parameter comprises a second upper bound data controller configured to determine whether the first projected data or the second projected data or the third projected data is constrained by an entity-based upper limit data.

In some cases, the fourth parameter comprises a stability data controller configured to set boundary conditions for one or more data values comprised in the first projected data, the second projected data, and the third projected data. In addition, the stability data controller may be configured to assess the robustness of projected data from one or more of the first computing model, the second computing model, or the third computing model relative to earlier time periods (e.g., a projected data value for a given month compared to an expected output range determined based on an average of the same model's projected data values for previous months).

It is appreciated that the fifth parameter comprises a confidence interval data controller configured to assess the first projected data, the second projected data, and the third projected data thereby determining that a data value range used to estimate the first projected data, the second projected data, or the third projected data is within an expected value range.

It is further appreciated that the sixth parameter comprises a variance data controller configured to determine by how much: a first datapoint comprised in the first projected data deviates from a first average value of the first projected data; or a second datapoint comprised in the second projected data deviates from a second average value of the second projected data; or a third data point comprised in the third projected data deviates from a third average data value of the third projected data. Moreover the variance parameter may beneficially enable temporally measuring variability data (e.g., measuring variability data for a month-over-month temporal period or a week-over-week temporal period) to determine differences in a given projected data (e.g., first projected data or second projected data or third projected data) generated at specific times within a given temporal window (e.g., for specific times within a given timeframe). This may be done to adjust for underlying trends (e.g., trends similar to volatility metrics in an analytics computing operation and/or identifying differencing trends in projected data and/or determining detrending information in a time series analysis associated with the projected data).

Data Interconnections

Figure 3A:
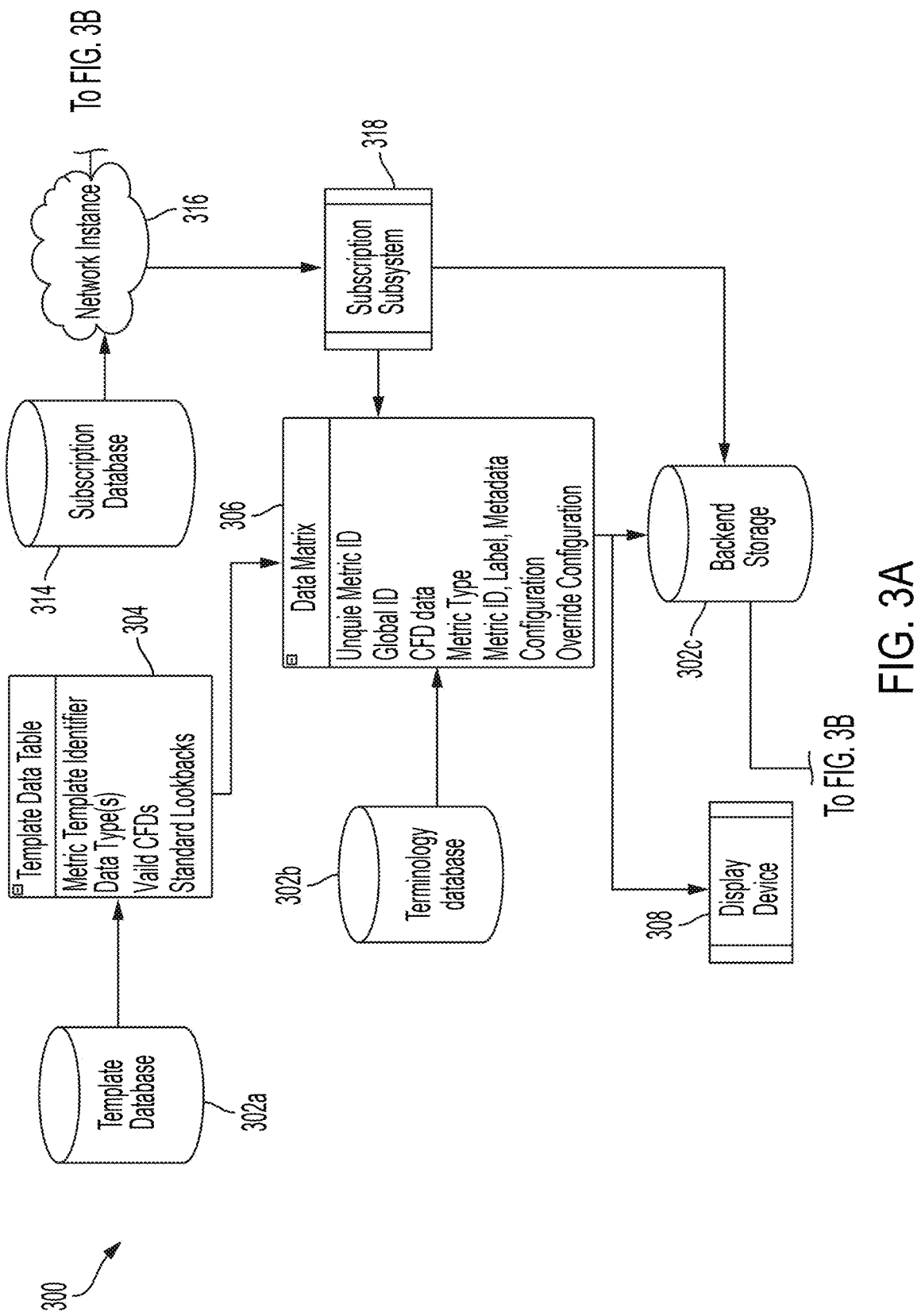

The disclosed secure storage system (e.g., secure storage system 100 of FIG. 1A) can be beneficially used to implement the data interconnection system shown in FIGS. 3A and 3B. In particular, the disclosed secure storage system may comprise a cloud-based or non-cloud-based content management platform including a suite applications that provide research institutions, educational institutions, government institutions, health institutions, social institutions, agricultural institutions, pharmacological institutions, etc., with at least one source of truth data storage system that minimizes data complexities and/or system complexities and enhances increased agility in communicating data between two or more subsystems comprised in the data interconnection system of FIGS. 3A and 3B.

Moreover, the secure storage system may be configured to manage secure or regulated data (e.g., files, documents, or records indicating a configurable data object) in addition to tracking critical information associated with the configurable data object and/or developing or enhancing parameters or data properties associated with the configurable data object. According to one embodiment, the configurable data object comprises a digital model, a systematized data construct of an object, or a digitized characterization of the object (e.g., real or otherwise) associated with a research, a trial, or bio-inquiry process, or a pharmacological material.

It is appreciated that the disclosed secure storage system can be used to globally connect a plurality of systems or data sources across multiple similar or dissimilar jurisdictions or locations. Specifically, the disclosed secure storage system can advantageously promote and streamline data collaboration among a plurality of systems or data sources as well as quickly provide secure access to data being stored in the secure storage system. According to one embodiment, the disclosed secure storage system may be used to regulate and/or monitor data states of content being stored within, or external to, the secure storage system. This may include leveraging a real-time electronic dashboard of the secure storage system to visualize and/or adaptively manipulate or otherwise analyze data from a plurality of data sources and thereby generate output data including metric data.

It is further appreciated that the disclosed secure storage system may have an attendant interconnection of a plurality of applications (e.g., computing applications or computing software) that are configured to receive and/or process data inputs from the plurality of data sources. For example, the plurality of applications may aggregate and/or clean the plurality of data inputs from the plurality of data sources. Furthermore, one or more of the applications may include logic that aggregate and/or clean data elements comprised in the plurality of data inputs. In particular, each application of the plurality of applications may have at least one of the following features:

An electronic data capture feature adapted for designing and/or building data matrices (e.g., electronic forms or customizable data intake forms) associated with the secure storage system. This can also include form for receiving user inputs from diverse user computing systems. In one embodiment, this includes a trial data intake form for aggregating and/or controlling trial data associated with an experiment or research.

A data transformation feature that can transform data inputs from the plurality of data sources from a first data state to a second data state or from a third data state to a fourth data state, etc.

A measurement capture feature for intaking a plurality of measurements from a plurality of sensors and/or other electronic or nonelectronic measuring devices that may or may not capture biological data.

A regulated content management feature adapted for approving, storing, and distributing content data (e.g., research content data, scientific content data, biological content data, bio-content data, request content data, etc.) based on, for example, metric data.

FIGS. 3A and 3B illustrate exemplary data interconnection system associated with generating metric data for driving electronic communications. According one embodiment, the data interconnection system associated with the disclosed secure storage system/network comprises a template database 302a, a terminology database 302b, a back-end storage 302c, a display device 308, a parameter subsystem 310, a first computing network 312, an inbound database 314, a second computing network 316, an outbound subscription system 318, and a plurality of analytics devices 320a . . . 320n.

In some implementations, the template database 302a is configured to generate template data structures used to format or otherwise control semantic properties or syntactic properties of a metric template data table 304. The template data table 304 can, for example, includes a first set of data parameters about each data template used in the secure storage system/network. For example, the first set of data parameters includes a metric template identifier, data types linked to a digital account or data sources used to generate metric data, attendant configurable data objects (CFDs), and lookback data. It is appreciated that the template data table 304 can be created or stored based on one or more of digital account data associated with the secure storage system and/or source data of one or more data sources that feed or otherwise funnel data into the secure storage system for processing or further analysis. It is further appreciated that the template data table 304 can be used in combination with data elements stored in the terminology database 302 and/or data elements derived from the subscription subsystem 318 to generate a data matrix 306. According to one embodiment, the data matrix 306 comprises a second set of data parameters including an identifier (ID) parameters, data parameters of CFDs associated with the template data table 304, metric type data parameter, metric identifier data parameter, matric label data parameter, metric configuration data parameter, and an override parameter. Furthermore, the terminology database 302b can be configured to store reference data associated with a data metric under consideration. In particular, this reference data may be electronically tied or linked to a configurable data object such that the reference data codifies and/or controls digital properties of a given configurable data object and can include control logic or computing code, and/or diagnostic data associated with the computing code, etc. In one embodiment, data matrix 306 consolidates information from both the template database 302a and the terminology database 302b, along with data from the subscription subsystem 318.

The subscription subsystem 318 may receive or otherwise electronically procure data from a subscription database 314 via the second computing network 316. In one embodiment, the subscription database 314 may include subscription data associated with a digital account and/or associated with one or more data sources used to generate the disclosed metric data. Furthermore, the subscription data base may be organized for information storage and extraction using a programming language (e.g., Lynx programming language) for large, distributed networks, using remote procedure calls. In addition, a plurality of information 320 may be funneled through the second computing network 316 to the subscription subsystem 318. This data can include: operation overrides data for overriding computing operations associated with or executed based on the data matrix 306; operations boost status data for prioritizing one or more computing operations associated with, or executed based on the data matrix 306; and operation indication data associated with a configurable data object for which a data matric is being computed based on the data matrix 306.

In one embodiment, the operations executed in conjunction with the data matrix 306 may include determining: efficacy data associated with a configurable data object; protocol or utilization methodology data associated with a configurable data object; protocol or procedural data associated with not associated with a configurable data object; success rate of a procedure (e.g., health or non-health procedure, trial procedure, an experimental procedure); efficacy data associated with multi-data channels used for prior data communications associated with the secure storage system/network; etc. In response to executing one or more of the foregoing computing operations based on the data matrix 306, output data including multi-dimensional visualizations comprising one or more data metrics for driving data communications may be generated. For example, the multi-dimensional visualizations can be displayed or visualized on a display device 308 (e.g., client or user display device). In one embodiment, the output data may also be stored in a backend storge 302c for future use. In addition, supplemental data from the subscription subsystem 318 may also be stored in conjunction with the output data within the backend storage. It is appreciated that a configuration file may be generated by the disclosed secure storage system/network based on user preferences, and/or digital account preferences, and/or source data formats, and/or metric type data, to automatically configure or control data modifications within one or more subsystems (e.g., template database 302a, terminology database 302b, backend storage 302c, display device 308, parameter subsystem 310, subscription subsystem 318, analytics devices and 320a . . . 320n) of the secure storage system/network.

In one embodiment, output data stored in the backend database 302c may be extracted or otherwise used by the parameter subsystem 310 to generate additional data analytics that alters, optimizes, enhances, projects, or otherwise customizes a plurality of data outputs including a plurality of data visualizations that are displayable on a plurality of analytics devices 320a . . . 320n. In some cases, the parameter subsystem 310 can be used by the secure storage system to create a property generation/configuration file (e.g., a property generation file in a JavaScript Object Notation (JSON) format, a Yet Another Markup Language (YAML) file, etc.) which can control one or more analytics operations executed in association with the analytics devices 320a . . . 320n. In exemplary embodiments, the property generation/configuration file may enable the analytics devices 320a . . . 320n to conduct various validations, including data deduplication checks and/or other quality control checks. In some instances, the property generation/configuration file beneficially allows the application of control logic or computing rules that drive data transmissions associated with a digital account.

Exemplary Projected Data

Figure 4:
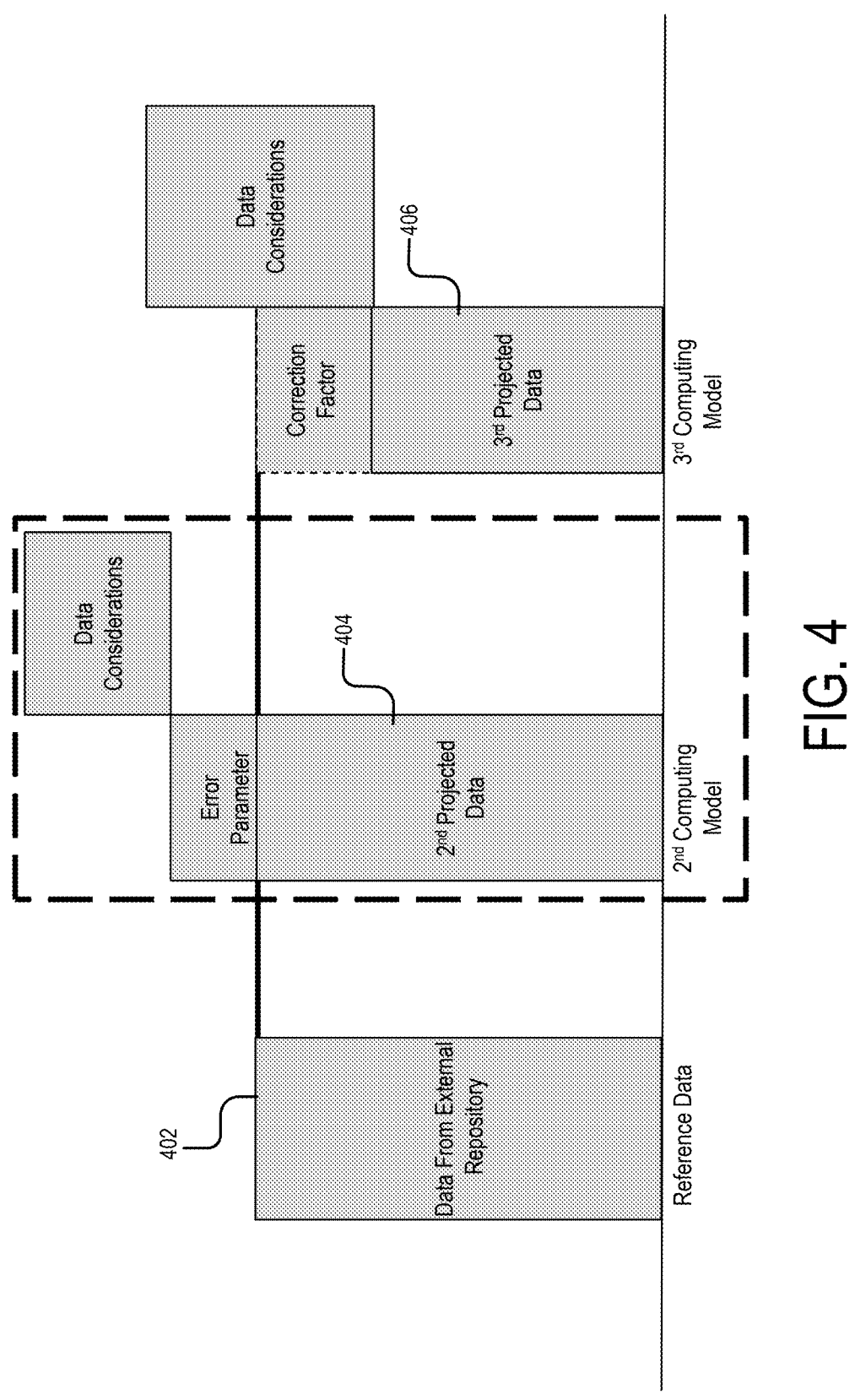
FIG. 4 shows an exemplary visualization indicating reference data from at least a record repository being compared to projected data generated by one or more of the disclosed computing models, according to some embodiments.

FIG. 4 shows an exemplary visualization indicating reference data from at least a record repository being compared to projected data generated by one or more of the disclosed computing models. As can be seen in this figure, the disclosed error parameter may be affixed to, or associated with a selected projected data (e.g., $2^{nd}$ projected data in the figure). In some cases, the reference data 402 may comprise data derived from a record repository external to the disclosed secure storage system such that the reference data 402 is compared to, or otherwise correlated with, a data projection 404 generated using the disclosed second computing model and/or a data projection 406 generated using the disclosed third computing model thereby generating assessment data (e.g., assessment data including the disclosed error parameter and/or an error correction factor and/or the disclosed fail rate associated with the first computing model or the second computing model or the third computing model) that informs how, for example, performant the second and/or third computing models are. It is appreciated that the data projection 404 that is generated using the second computing model can be based on data derived from a data repository (e.g., metric record repository) that is native or internal to the disclosed secure storage system in combination with data comprised in the reference data 402 derived from the record repository that is external to the disclosed secure storage system. Furthermore, the data projection 406 may be based on data derived from the data repository (e.g., metric record repository) that is native or internal to the disclosed secure storage system without any reference data 402.

It is appreciated that, the disclosed error parameter may inform a strategy for: determining how one computing model performs relative to another computing model; resolving data discrepancies between a projected data associated with one computing model relative to projected data of another computing model via, for example, a correction factor; and generating data considerations for optimizing model performance of one or more computing models in the computing model repository. According to one embodiment, the correction factor comprises quantitative and/or qualitative data that can be used to parameterize one or more parameters of one or more computing models within the computing model repository so that the parameterized one or more computing models can generate projected data within accurate tolerance values or threshold values. Furthermore, the data considerations can comprise data properties and/or data insights that provide rationale and/or information about reasons why a given computing model is performing in a particular manner.

Exemplary Table Comprised in the Disclosed Digital Report

FIG. 5 shows an exemplary table comprised in the disclosed digital report which is generated based on one or more computing models in the computing model repository. As can be seen in this figure, the exemplary table comprises a plurality of data groupings including temporal data (e.g., Date), user category data, data associated with a configurable data object, dispensing strategy data, and protocol projection data. The temporal data, for example, can indicate a past, a current, or a future date and/or time associated with a given dispensing strategy and/or a given protocol projection. Furthermore, the user category data may comprise user profile groupings associated with a given dispensing strategy and/or a given protocol projection for a given date and/or time. The configurable data object data (e.g., configurable data object column) may comprise a plurality of similar or dissimilar configurable data objects associated with a dispensing strategy and/or a protocol projection. It is appreciated that data dependencies may exist between data associated with the configurable data object and the dispensing strategy data and/or protocol projection data. These data dependencies can establish various causal and/or noncausal dependencies between the data associated with the configurable data object and the dispensing strategy data and/or the protocol projection data. For example, the dispensing strategy data may indicate a dispensing strategy associated with a given configurable data object which can be tied or linked to a given protocol involving or associated with the configurable data object and which can be comprised in the protocol projection data. In one embodiment, the protocol projection data may not rely or depend on a configurable data object or a dispensing strategy as indicated at the row with temporal data "Date 5."

Exemplary Models Comprised in the Disclosed Computing Model Repository

According to one embodiment, the disclosed computing model repository may have or comprise a plurality of computing models that are parameterized or otherwise configured to generate projection data, or predicting data, or other data estimates. For example, the computing model repository may comprise a first computing model (e.g., a first digital projection model) which can be based on volumetric health data derived from, for example, prescription claims, procedure claims, etc.

Because different computing models in the computing model repository may have different use cases for one or more user categories, specific computing models may be selected for specific use cases. Criteria for selecting a given computing model for a given use case may include availability and quality of the received data/information (e.g., data in the metric data repository and the record repository, etc.). In some cases, historical model performance data in conjunction with the availability and/or quality of the received data/information serve as criteria for selecting a model from the computing model repository. According to some embodiments, if it is determined that the received data is inadequate for model selection, the received data may be combined or further processed to generate enhanced data which can serve as basis or criteria for selecting a computing model within the computing model repository.

According to one embodiment, the first computing model leverages data from the disclosed metric data repository to generate the disclosed first projected data. In particular, the data from the metric data repository can comprise internally generated metric data and/or internally generated analytics data associated with the computing storage network. For example, the first projected data may be based on metric information or metric data in the metric data repository that is associated with a specific type or category of configurable data objects comprised in a group of configurable data objects to generate the first projected data.

The second computing model may leverage data comprised in the record repository that is external to the computing storage network as well as data in the metric data repository to generate the second projected data. For example, the second computing model can operate on data associated with the group of configurable data objects in the metric data repository and/or the specific type or category of configurable data objects in combination with external data in the record repository that is external to the computing storage network, such that the external data can be dependent or independent on the group of configurable data objects. By operating on these types of data, the second computing model can generate the second projected data.

In additions, the third computing model leverages data from the disclosed metric data repository to generate the disclosed third projected data. In particular, the data from the metric data repository can comprise internally generated metric data and/or internally generated analytics data associated with the computing storage network. For example, the third projected data may be based on metric information or metric data in the metric data repository that is associated with the group of configurable data objects referenced above. It is appreciated that the third computing model is different from the first computing model in that the third computing model can be based on a first partition of a group of configurable data objects whereas the first computing model can be based on a second partition of the group of configurable data objects.

Exemplary Metric Data Comprised in the Disclosed Metric Data Repository

According to one embodiment, metric data (e.g., first metric data and/or the second metric data) comprises an optimization indicator that is generated based on data state transitions of data elements associated with one or more digital profiles associated with the disclosed computing storage system or network. The optimization indicator, for example, may indicate a rate of transition of data elements associated with a first data communication and/or a second data communication. In some embodiments, the optimization indicator comprises statistical values or data percentages that define exposure probability data tied to one or more user data associated with the first data communication and/or the second data communication. Furthermore, the first metric data and/or the second metric data can comprise quantitative data conversions and/or qualitative data conversions associated with the first data communication and/or the second data communication relative to user data linked to the first data communication and/or the second data communication. It is appreciated that the qualitative data conversions and/or the quantitative data conversions can indicate a rate of data element transitions associated with the user data linked to the first data communication and/or the second data communication. It is further appreciated that the user data linked to the first data communication and/or the second data communication can comprise at least one of demographic data, patient data, race data, treatment protocol data associated with or not associated with a configurable data object, gender data, age data, health data, non-health data, health professional (e.g., protocol provider) type data (e.g., doctor data, nurse data, pharmacist data, etc.), non-health professional data, interaction data linked to the health data or non-health data; time window data associated with the interaction data, health institution (e.g., protocol entity) data and/or educational institution data and/or government institution data, and claims data (e.g., health claims data/ educational claims data/government claims data).

In some implementations, a metric control logic is automatically activated (e.g., computationally activated) and/or automatically triggered (e.g., computationally triggered) and/or otherwise automatically generated (e.g., computationally generated) based on receiving the first data using the first data matrix and/or based on receiving the second data using the second data matrix. It is appreciated that the metric control logic comprises instructions, rules, or code that can be used by the one or more data engines to generate and/or determine the first metric data and/or the second metric data. It is further appreciated that the first metric data and/or the second metric data comprises one or more of: a data communication parameter adapted or configured to direct the first data communication and/or direct the second data communication; and/or an electronic data communication controller adapted or configured to customize and/or control computing operations associated with the first data communication and/or the second data communication.

In one embodiment, the first metric data and/or the second metric data comprises one or more data metrics associated with, or computed based on the first data and/or the second data. In addition, the first metric data and/or the second metric data can provide contextual information: that is associated with the first data and/or the second data; and that drives a data communication strategy associated with the first data communication and/or the second data communication.

In one embodiment, the first data matrix and/or the second data matrix comprises a template or a structure for configuring and/or creating the metric control logic referenced above based on the first data source and/or the second data source and thereby generate the first metric data and/or the metric second data. In particular, the first data matrix and/or the second data matrix can be regarded as a configurable and/or customizable data structure or a data intake template that can be used to: receive the first data and/or the second data; format the first data and/or second data; initiate and/or facilitate generating of the metric control logic referenced above which can be used to determine or otherwise generate the first metric data and/or the second metric data. It is appreciated that the first data matrix and/or the second data matrix facilitate: defining data components of one or more metrics or optimization indicators that drive or optimize data communications (e.g., first data communication and/or second data communication); and activating one or more metric control logic to generate the one or more metrics or optimization indicators based on the first data and/or the second data. It is further appreciated that the one or more metric control logic may comprise one or more computing programming languages that are: associated with, or based on the first data source or the second data source referenced above; and/or based on a digital account associated with the first data source or the second data source. In some cases, the first data matrix and/or the second data matrix can be used to select one or more computing models (e.g., machine learning computing model and/or artificial intelligence computing model) together with the one or more metric control logic based on the first data and/or the second data. In such cases, the one or more metric control logic can apply one or more of the first data and/or the second data to the selected one or more computing models and thereby generate at least one of the first metric data and/or the second metric data.

It is appreciated that the configurable data object referenced above can be a digital representation of a pharmacological compound and/or a digital representation computing system (e.g., a biomedical computing system). It is further appreciated that one or more models disclosed herein (e.g., first computing model or second computing model) can be parameterized based on one or more of: a prescription (Rx) parameter (e.g., first parameter referenced elsewhere herein); a medical records (Mx) parameter (e.g., second parameter referenced elsewhere herein); and a therapy (Tx) parameter (e.g., third parameter referenced elsewhere herein), the Tx parameter being based on at least the Rx parameter and the Mx parameter. Moreover, the record repository that is external to the computing storage network can comprise one or more of: first census data indicating first policy information associated with one of the configurable data objects or a first medical procedure; or second census data indicating second policy information associated with the configurable data object or the first medical procedure or a second medical procedure. In some cases, the protocol projection data or procedure projection data referenced above comprises a health procedure projection associated with the first set of user categories or the second set of user categories.

Exemplary Metrics

According to one embodiment, the disclosed methods and systems leverage multiple quality control parameters/metrics including the above referenced error parameter, a lower bound parameter, a first upper bound parameter, a second upper bound parameter, a stability parameter, a confidence interval parameter, and a variance parameter.

According to one embodiment, the error parameter referenced herein comprises a data quality controller configured to enable determining how quantitively close or qualitatively close a given data projection (e.g., data projection or projected data from the first computing model, or the second computing model, or the third computing model) is, based on a first sample size (e.g., a subset of a larger sample size) relative to a second sample size (e.g., a larger sample size for which the first sample size is a subset). In one embodiment, the first sample size may be based on data from the metric data repository while the second sample size is based on data from both the metric data repository and the record repository that is external to the computing storage network referenced herein. It is appreciated that the term "data controller" as used herein in association with the foregoing parameters can be a computing function or a computing routine that measures, monitors, tracks, or determines specific properties (e.g., quantitative and/or qualitative data properties) associated with one or more computing data outputs (e.g., projected data) resulting from a given data context (e.g., statistical data context, quality control data context, etc.) of a given computing operation for which the resulting computing data outputs are generated. Thus, the various metrics/parameters referenced below can comprise data quality controllers that enable making quality control determinations associated with the first computing model, the second computing model, and the third computing model based on the first projected data, the second projected data, and the third projected data, respectively.

In an exemplary implementation, the lower bound parameter comprises a data quality controller (e.g., a lower bound data controller) configured to enable verifying that a given projected data from the first computing model, or the second computing model, or the third computing model referenced above satisfies a minimum threshold value or is bound by a minimum threshold value (e.g., a minimum quantitative value). Furthermore, the lower bound parameter can beneficially enable estimating a total sample size for a given projection based on subset data of said total sample size. For example, the lower bound data quality controller can test whether a projected data value comprised in a given projected data exceeds a corresponding sample size from a record repository (e.g., metric repository) internal to the disclosed secure storage system, when said projected data value is based on a subset of those records (e.g., records comprised in the record repository internal to the disclosed secure storage system). Note that this can happen for any of the three disclosed computing models (e.g., the first computing model, the second computing model, and the third computing model) due to various data considerations. For example, if one of the three computing models generates a projected data value of 100 based on a subset of 50 data points out of a total of 70 records available in the record repository for some specific group of configurable data objects and/or user categories, the lower bound data quality controller can check or determine if this projected data value exceeds 70, and then generate a corresponding lower bound data output for the model in question. As will be discussed further below, the first lower bound output, the second lower bound output, and the third lower bound output can be stored in a model efficiency function or a model efficiency data matrix that assesses or determines, based on aggregate results or data outputs generated using outputs from two or more of the above referenced quality control metrics to determine a performant computing model among the first computing model, the second computing model, and the third computing model.

The first upper bound parameter referenced above comprises a data quality controller configured to determine, test or assess whether projected data from the first computing model or the second computing model or the third computing model is constrained or otherwise bound by specific jurisdiction-based (e.g., a state-based, a country-based, or zip code-based) upper limit data (e.g., a quantitative number). For example, the first upper bound parameter may advantageously enable determining whether a given computing model generates projected data based on: a given population comprised in a sample size; the sample size; total number of electronic computations associated with a configurable data object relative to the sample size; and extreme electronic computations associated with the population relative a given jurisdiction. By testing projection/projected data from the first computing model, the second computing model, and the third computing model using the first upper bound parameter, a first upper bound output1, a first upper bound output2, and a first upper bound output3, respectively, may be generated for the first computing model, the second computing model, and third computing model. It is appreciated that the first upper bound output1, the first upper bound output2, and the first upper bound output3 may also be stored in the model efficiency function or the model efficiency matrix referenced above.

The second upper bound parameter referenced above may comprise a data quality controller configured to determine test or assess whether projected data from the first computing model or the second computing model or the third computing model is constrained or otherwise bound by specific entity-based (e.g., an institution-based, a hospital-based, a facility-based, etc.) upper limit data (e.g., a quantitative data value). For example, the second upper bound parameter may advantageously enable determining whether a given computing model generates projected data based on: a total number of electronic computations associated with a configurable data object relative to a sample size; extreme electronic computations associated with the population relative a given entity (e.g., an institution, a hospital, a facility, a school, etc.); a floor data value (e.g., a quantitative data value) indicating a minimum upper bound derived from empirically analyzing data associated with the population; data (e.g., coverage data) associated with a given entity. By testing projection/projected data from the first computing model, the second computing model, and the third computing model using the second upper bound parameter, a second upper bound output1, a second upper bound output2, and second upper bound output3, respectively, may be generated for the first computing model, the second computing model, and third computing model. It is appreciated that the second upper bound output1, the second upper bound output2, and the second upper bound output3 may also be stored in the model efficiency function or the model efficiency matrix referenced above.

In one embodiment, the stability parameter is based on a statistical process controller or a data quality controller that is configured to set control limits (e.g., an upper control limit, a lower control limit, a median control limit, etc.) or boundary conditions for the data values (e.g., quantitative data value) comprised in the projected data generated by the first computing model, the second computing model, and the third computing model. This can be based on priori or a priori statistical data that inform the selection of the control limits or the boundary conditions for the data values comprised in the projected data. In effect, the stability parameter beneficially enables determining the robustness (e.g., stable results that does not cause model output deviations) of projected data outputted using the first computing model, the second computing model, and the third computing model. Thus, the stability parameter can help indicate how stable a computing model by generating, for example, stability output1 data for the first computing model, stability output2 data for the second computing model, and stability output3 data for the third computing model. Stability output1 data, stability output2 data, and stability output3 data may also be stored in the model efficiency function or model efficiency matrix referenced above. According to one embodiment, the statistical process controller may beneficially enable generating multiple different parameters associated with upper limit data and/or lower limit data that provide controls, warnings, or other data flags associated with a given generated projected data as well as provide multiple distinct types of data values such as averaging data values (e.g., mean data) and/or moving range values associated with a given projected data.

Another parameter comprised in the quality control parameters/metrics is the confidence interval parameter. According to one embodiment, the confidence interval parameter comprises a data quality controller configured to assess (e.g., assesses using one or more statistical models such as t-test computing operations, z-test computing operations, bootstrapping computing operations, and/or batch means computing operations) projected data from the first computing model, the second computing model, and the third computing model to determine data value ranges (e.g., quantitative data value ranges) used to estimate the projected data and thereby provide range data that establish whether or not the projected data is within expected or acceptable value ranges (e.g., quantitative value data ranges). Thus, the confidence interval parameter may be used to generate confidence data value ranges (e.g., c_range1, c_range2, and c_range3) for projected data generated for the first computing model, the second computing model, and the third computing model. The confidence data value ranges (e.g., c_range1, c_range2, and c_range3) may also be stored or processed using the model efficiency function or model efficiency matrix discussed above.

Additionally, the variance parameter may comprise a data quality controller configured to determine, based on generated projected data for each of the first computing model, the second computing model, and the third computing model variance information associated with a given projected data.

In particular, the variance parameter beneficially enables determining by how much (e.g., variance information) datapoints ((e.g., quantitative datapoints) comprised in a given generated projected data differ or deviate from average data values of the projected data. In effect, the variance parameter measures data spread or data dispersion associated with projected data from the first computing model or the second computing model or the third computing model and thereby generate variance data (e.g., variance1, variance2, and variance 3) for the first computing model, the second computing model and the third computing model, respectively. It is appreciated that the variance data may also be stored or processed in the model efficiency function or model efficiency matrix. Moreover the variance parameter/variance data controller may beneficially enable temporally measuring variability data (e.g., measuring variability data for month-over-month temporal period or week-over-week temporal period) to determine differences in a given projected data (e.g., first projected data or second projected data or third projected data) generated at specific times within a given temporal window (e.g., for specific times within a given timeframe). This may be done to adjust for underlying trends (e.g., trends similar to volatility metrics in an analytics computing operation and/or identifying differencing trends in projected data and/or determining detrending information in a time series analysis associated with the projected data).

FIG. 6 shows an exemplary model efficiency function or model efficiency matrix which aggregates one or more data outputs associated with applying the foregoing quality control parameters/metrics. As can be seen this figure: the first lower bound parameter may be used to generate, based on projected data, first lower bound output for the first computing model, second lower bound output for the second computing model, and third lower bound output for third computing input; the first upper bound parameter may be used to generate, based on projected data, first upper bound output1 for the first computing model, first upper bound output2 for the second computing model, and first upper bound output3 for the third computing model; the second upper bound parameter may be used to generate, based on projected data, second upper bound output1 for the first computing model, second upper bound output2 for the second computing model, and second upper bound output3 for the third computing model; the stability parameter may be used to generate, based on the projected data, stability output1 for the first computing model, stability output2 for the second computing model, and stability output3 for the third computing model; the confidence interval parameter may be used to generate, based on the projected data, c_range1 for the first computing model, c_range2 for the second computing model, and c_range3 for the third computing model; the variance parameter may be used to generate, based on the projected data, variance1 for the first computing model, variance2 for the second computing model, and variance3 for the third computing model; and the error parameter may be used to generate, based on projected data, quantitative data values including: an e1 data value for the first computing model, an e2 data value for the second computing model, and an e3 data value for the third computing model.

It is appreciated that weight data w11-w37 may be applied to the various metric outputs as shown in FIG. 6. The weights, w11-w37 beneficially constrain or control the various parameter outputs to enable operating (e.g., combining, correlating, etc.) the parameter output values for each computing model to enable using the model efficiency function or the model efficiency matrix to generate fail rate data for each computing model. For example, first fail rate data (e.g., a quantitative output and/or a qualitative output) may be generated for the first computing model based on combining w11(first lower bound output), w12(first upper bound output1), w13(second upper bound output1), w14(stability output1), w15(C_range1), w16(variance1), and w17(e1). Similarly, second fail rate data and third fail rate data may be generated for the second computing model and the third computing model, respectively, as done for the first computing model. It is appreciated that the first fail rate data, the second fail rate data, and the third fail rate data may be compared or otherwise contrasted against each other to determine which model has the lowest fail rate value in the fail rate data. In particular, the most performant computing model comprised in a model group consisting/comprising of the first computing model, the second computing model, or the third computing model would be a computing model that has a lowest quantitative value comprised in the fail rate data and/or have a qualitative value comprised in the fail rate data that indicates that model outputs (e.g., projected data) of the most performant model are optimal relative to the remaining models in the model group which would have suboptimal model outputs based on the foregoing quality control metrics. It is further appreciated that the weights w11-w37 can be selected based on: model type; and/or parameter type; and/or whether the data operated on is from the metric data repository or from the record repository that is external to the computing storage network. According to one embodiment, the weights w11-w37 can have substantially similar values for each of the first computing model, the second computing model, and the third computing model. Furthermore, the weights w11-w37 may have the same upper bound output weight value (e.g., quantitative value) and/or the same lower bound output weight value (e.g., quantitative value) as the case may require.

The above-described features and applications can be implemented as software processes or data engines include specified sets of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

In this specification, the term "application" or "software" is meant to include firmware residing in read-only memory or applications stored in magnetic storage, which can be read into memory for processing by a processor. Also, in some implementations, multiple software or application technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs. Examples of computer programs or computer code include machine code, for example is produced by a compiler, and files including higher-level code that are executed by a computer, an electronic component, or a microprocessor using an interpreter.

A computer program (also known as a program, software, software application, application, script, or code) can be written in any form of programming language, including compiled or interpreted languages, declarative or procedural languages, and it can be deployed in any form, including as a standalone program or as a sub-system, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more sub-systems, sub programs, or portions of code). A computer program can be deployed to be executed on one computer or on multiple computers that are located at one site or distributed across multiple sites and interconnected by a communication network.

As used in this specification and any claims of this application, the terms "computer," "server," "processor," and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it is appreciated that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more.

Various terms used herein have meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

It is appreciated that the term optimize/optimal and its variants (e.g., efficient, or optimally) may simply indicate improving, rather than the ultimate form of perfection or the like.

It is further appreciated that any portion or element of any embodiment (structure, method, etc.) disclosed herein may be combined with any portion or element of any other embodiment (structure, method, etc.) disclosed herein.

Additionally, the section headings herein are provided for consistency with the suggestions under 37 CFR 1.77 or otherwise to provide organizational cues. These headings shall not limit or characterize the disclosed embodiment(s) set out in any claims that may issue from this disclosure. Specifically, and by way of example, although the headings refer to a "Technical Field," such claims should not be limited by the language chosen under this heading to describe the so-called technical field. Further, a description of a technology in the "Background" is not to be construed as an admission that technology is prior art to any disclosed embodiment(s) in this disclosure. Neither is the "Summary" to be considered as a characterization of the disclosed embodiment(s) set forth in issued claims. Furthermore, any reference in this disclosure to "embodiment" in the singular should not be used to argue that there is only a single point of novelty in this disclosure. Multiple embodiments may be set forth according to the limitations of the multiple claims issuing from this disclosure, and such claims accordingly define the disclosed embodiment(s), and their equivalents, which are protected thereby. In all instances, the scope of such claims shall be considered on their own merits in light of this disclosure, but should not be constrained by the headings set forth herein.

The invention claimed is:

1. A method for error parameter generation and utilization for data projections in a computing storage network, the method comprising:

activating, using one or more computing device processors, a computing storage network, the computing storage network being communicatively connected to:
a computing model repository,
a metric data repository, and
a record repository that is external to the computing storage network;

determining, using the one or more computing device processors, a first computing model comprised in the computing model repository;

determining or accessing, using the one or more computing device processors, first data comprised in the metric data repository;

generating, using the one or more computing device processors, based on the first computing model and based on the first data comprised in the metric data repository, first projected data;

formatting, using the one or more computing device processors, the first projected data to have one or more of: a first type of granularity, or a second type of granularity, or a third type of granularity, or a fourth type of granularity, or a fifth type of granularity;

determining or accessing, using the one or more computing device processors, a second computing model associated with the computing model repository;

determining or accessing, using the one or more computing device processors, the first data comprised in the metric data repository and second data comprised in the record repository that is external to the computing storage network;

generating, using the one or more computing device processors, based on the second computing model, the first data comprised in the metric data repository and the second data comprised in the record repository that is external to the computing storage network, second projected data;

formatting, using the one or more computing device processors, the second projected data to have one or more of: the first type of granularity, or the second type of granularity, or the third type of granularity, or the fourth type of granularity, or the fifth type of granularity;

determining or accessing, using the one or more computing device processors, a third computing model comprised in the computing model repository;

determining or accessing, using the one or more computing device processors, third data comprised in the metric data repository;

generating, using the one or more computing device processors, based on the third computing model and the third data, third projected data;

formatting, using the one or more computing device processors, the third projected data to have one or more of: the first type of granularity, or the second type of granularity, or the third type of granularity, or the fourth type of granularity, or the fifth type of granularity;

determining, using the one or more computing device processors, based on the second data comprised in the record repository that is external to the computing storage network, an error parameter associated with the first projected data, the second projected data, and the third projected data;

ranking, using the one or more computing device processors, based on the error parameter, the first projected data, the second projected data, and the third projected data;

selecting, using the one or more computing device processors, based on the ranking, at least one of the first projected data, the second projected data, and the third projected data; and generating, using the one or more computing device processors, based on selecting one of the first projected data or the second projected data or the third projected data, a digital report, wherein the digital report indicates:

dispensing projection data of a first configurable data object associated with a first set of user categories, a second set of user categories, or a third set of user categories, and protocol projection data or procedure projection data associated with the first set of user categories, the second set of user categories, or the third set of user categories.

2. The method of claim 1, wherein:

the first type of granularity is based on protocol provider data, the second type of granularity is based on protocol entity data, the third type of granularity is based on first location data associated with the protocol provider data or protocol entity data;

the fourth type of granularity is based on second location data associated with the protocol provider data or protocol entity data, or the fifth type of granularity is based on third location data associated with the protocol provider data or the protocol entity data.

3. The method of claim 1, further comprising:

determining, using the one or more computing device processors, the first set of user categories or the second set of user categories or the third set of user categories;

extracting, using the one or more computing device processors:

first quantitative data from the first projected data, second quantitative data from the second projected data, and third quantitative data from the third projected data;

ranking, using the one or more computing device processors, based on the error parameter, the first quantitative data, the second quantitative data, and the third quantitative data;

selecting, using the one or more computing device processors, based on the ranking of the first quantitative data, the second quantitative data, and the third quantitative data, one of the first projected data, the second projected data, and the third projected data; and generating, using the one or more computing device processors, based on selecting one of the first projected data, the second projected data, or the third projected data, the digital report.

4. The method of claim 3, wherein the error parameter is determined based on computationally mapping:

a first data element comprised in the first quantitative data to a second data element comprised in the second quantitative data, thereby generating first mapped data, a second data element comprised in the first quantitative data to a third data element comprised in the third quantitative data thereby generating second mapped data, and the second data element comprised in the second quantitative data to the third data element comprised in the third quantitative data thereby generating third mapped data.

5. The method of claim 4, wherein the error parameter is determined based on at least a data discrepancy between one or more of:

the first mapped data and the second mapped data, the first mapped data and the third mapped data, or the second mapped data and the third mapped data.

6. The method of claim 1, wherein the first computing model, the second computing model, or the third computing model is parameterized based on one or more of:

a first parameter, a second parameter, and a third parameter.

7. The method of claim 1, wherein the metric data repository comprises one or more of:

efficacy data associated with the first configurable data object, first protocol data associated with the first configurable data object, second protocol data associated with a second configurable data object, and third protocol data.

8. The method of claim 1, wherein the protocol projection data or procedure projection data comprises a procedure associated with the first set of user categories or the second set of user categories.

9. The method of claim 1, wherein the computing storage network is comprised in a cloud computing platform.

10. The method of claim 1, further comprising:

generating, based on the first projected data, a first set of metrics including a first data value associated with the error parameter;

generating, based on the second projected data, a second set of metrics including a second data value associated with the error parameter;

generating, based on the third projected data, a third set of metrics including a third data value associated with the error parameter;

combining data elements of the first set of metrics to generate first fail rate data for the first computing model;

combining data elements of the second set of metrics to generate second fail rate data associated with the second computing model;

combining data elements of the third set of metrics to generate third fail rate data associated with the third computing model;

determining, based on the first fail rate data, the second fail rate data, and the third fail rate data, that:

a first quantitative value of the first fail rate data IS smaller than a second quantitative value of the second fail rate data, or the first quantitative value of the first fail rate data IS smaller than a third quantitative value of the third fail rate data;

selecting, based on the determining, that the first computing model IS a performant computing model; and generating, based on the selecting, the digital report based on the first projected data.

11. The method of claim 10, wherein the first set of metrics or the second set of metrics or the third set of metrics is based on a first parameter, a second parameter, a third parameter, a fourth parameter, a fifth parameter, a sixth parameter, or the error parameter.

12. The method of claim 11, wherein the first parameter comprises a lower bound data controller configured to enable verifying that the first projected data or the second projected data or the third projected data is bound by a minimum threshold value.

13. The method of claim 11, wherein the second parameter comprises a first upper bound data controller configured to determine whether the first projected data or the second projected data or the third projected data is constrained by a jurisdiction-based upper limit data.

14. The method of claim 11, wherein the third parameter comprises a second upper bound data controller configured to determine whether the first projected data or the second projected data or the third projected data is constrained by an entity-based upper limit data.

15. The method of claim 11, wherein the fourth parameter comprises a stability data controller configured to set boundary conditions for one or more data values comprised in the first projected data, the second projected data, and the third projected data.

16. The method of claim 11, wherein the fifth parameter comprises a confidence interval data controller configured to assess the first projected data, the second projected data, and the third projected data thereby determining that a data value range used to estimate the first projected data, the second projected data, or the third projected data is within an expected value range.

17. The method of claim 11, wherein the sixth parameter comprises a variance data controller configured to determine by how much:

a first datapoint comprised in the first projected data deviates from a first average value of the first projected data, or a second datapoint comprised in the second projected data deviates from a second average value of the second projected data, or a third data point comprised in the third projected data deviates from a third average data value of the third projected data.

18. A system for error parameter generation and utilization for data projections in a computing storage network, the system comprising:

one or more hardware computing system processors; and at least one memory storing instructions, that when executed by the one or more hardware computing system processors causes the one or more hardware computing system processors to:

activate a computing storage network, the computing storage network being communicatively connected to:

a computing model repository, a metric data repository, and a record repository that is external to the computing storage network;

determine or access a first computing model comprised in the computing model repository;

determine or access first data comprised in the metric data repository;

generate, based on the first computing model and based on the first data comprised in the metric data repository, first projected data;

format the first projected data to have one or more of: a first type of granularity, or a second type of granularity, or a third type of granularity, or a fourth type of granularity, or a fifth type of granularity;

determine or access a second computing model associated with the computing model repository;

determine or access the first data comprised in the metric data repository and second data comprised in the record repository that is external to the computing storage network;

generate, based on the second computing model and based on the first data comprised in the metric data repository and the second data comprised in the record repository that is external to the computing storage network, second projected data;

format the second projected data to have one or more of: the first type of granularity, or the second type of granularity, or the third type of granularity, or the fourth type of granularity, or the fifth type of granularity;

determine or access a third computing model comprised in the computing model repository;

determine or access third data comprised in the metric data repository;

generate, based on the third computing model and the third data, third projected data;

format the third projected data to have one or more of: the first type of granularity, or the second type of granularity, or the third type of granularity, or the fourth type of granularity, or the fifth type of granularity;

determine, based on the second data comprised in the record repository that is external to the computing storage network, an error parameter associated with the first projected data, the second projected data, and the third projected data;

rank, based on the error parameter, the first projected data, the second projected data, and the third projected data;

select, based on the ranking, at least one of the first projected data, the second projected data, and the third projected data; and generate, based on selecting one of the first projected data or the second projected data or the third projected data, a digital report wherein the digital report indicates:

dispensing projection data of a first configurable data object associated with a first set of user categories, a second set of user categories, or a third set of user categories, and protocol projection data or procedure projection data associated with the first set of user categories, the second set of user categories, or the third set of user categories.

19. The system of claim 18, wherein:

the first type of granularity is based on protocol provider data, the second type of granularity is based on protocol entity data, the third type of granularity is based on first location data associated with the protocol provider data or protocol entity data, the fourth type of granularity is based on second location data associated with the protocol provider data or protocol entity data, or the fifth type of granularity is based on third location data associated with the protocol provider data or the protocol entity data.

20. A method for error parameter generation and utilization for data projections in a computing storage network, the method comprising:

activating, using one or more computing device processors, a computing storage network, the computing storage network being communicatively connected to:

a computing model repository, a metric data repository, and a record repository that is external to the computing storage network;

determining or accessing, using the one or more computing device processors, a first computing model comprised in the computing model repository;

determining or accessing, using the one or more comput-
ing device processors, first data comprised in the metric
data repository;

generating, using the one or more computing device
processors, based on the first computing model and
based on the first data comprised in the metric data
repository, first projected data;

formatting, using the one or more computing device
processors, the first projected data to have one or more
of: a first type of granularity, or a second type of
granularity, or a third type of granularity, or a fourth
type of granularity, or a fifth type of granularity;

determining or accessing, using the one or more comput-
ing device processors, a second computing model asso-
ciated with the computing model repository;

determining or accessing, using the one or more comput-
ing device processors, the first data comprised in the
metric data repository and second data comprised in the
record repository that is external to the computing
storage network;

generating, using the one or more computing device
processors, based on the second computing model and
based on the first data comprised in the metric data
repository and the second data comprised in the record
repository that is external to the computing storage
network, second projected data;

formatting, using the one or more computing device
processors, the second projected data to have one or
more of: the first type of granularity, or the second type
of granularity, or the third type of granularity, or the
fourth type of granularity, or the fifth type of granular-
ity;

determining or accessing, using the one or more comput-
ing device processors, a third computing model com-
prised in the computing model repository;

determining or accessing, using the one or more comput-
ing device processors, third data comprised in the
metric data repository;

generating, using the one or more computing device
processors, based on the third computing model and the
third data, third projected data;

formatting, using the one or more computing device
processors, the third projected data to have one or more
of: the first type of granularity, or the second type of
granularity, or the third type of granularity, or the fourth
type of granularity, or the fifth type of granularity;

determining, using the one or more computing device
processors, based on the second data comprised in the
record repository that is external to the computing
storage network, an error parameter associated with the
first projected data, the second projected data, or the
third projected data;

ranking, using the one or more computing device proces-
sors, based on the error parameter, the first projected
data, the second projected data, and the third projected
data;

selecting, using the one or more computing device pro-
cessors, based on the ranking, one or more of the first
projected data, the second projected data, and the third
projected data; and generating, using the one or more computing device
processors, based on selecting one of the first projected
data or the second projected data or the third projected
data, a digital report, wherein the digital report indi-
cates one or more of:

dispensing projection data of a first configurable data
object associated with a first set of user categories, a
second set of user categories, or a third set of user
categories, and protocol projection data or procedure projection data
associated with the first set of user categories, the
second set of user categories, or the third set of user
categories.

* * * * *